(12) United States Patent
Moon et al.

(10) Patent No.: US 12,237,929 B2
(45) Date of Patent: Feb. 25, 2025

(54) METHOD AND APPARATUS FOR SIDELINK COMMUNICATION

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 593 days.

(21) Appl. No.: 17/439,968

(22) PCT Filed: Jun. 9, 2020

(86) PCT No.: PCT/KR2020/007442
§ 371 (c)(1),
(2) Date: Sep. 16, 2021

(87) PCT Pub. No.: WO2020/251237
PCT Pub. Date: Dec. 17, 2020

(65) Prior Publication Data
US 2022/0255680 A1 Aug. 11, 2022

(30) Foreign Application Priority Data

Jun. 14, 2019 (KR) .......................... 10-2019-0070763
Jul. 1, 2019 (KR) .......................... 10-2019-0078976
(Continued)

(51) Int. Cl.
*H04W 72/21* (2023.01)
*H04L 1/1812* (2023.01)
(Continued)

(52) U.S. Cl.
CPC .......... *H04L 1/1854* (2013.01); *H04L 1/1812* (2013.01); *H04L 1/1861* (2013.01);
(Continued)

(58) Field of Classification Search
CPC .............................. H04W 72/21; H04W 72/23
(Continued)

(56) References Cited

U.S. PATENT DOCUMENTS 10,306,652 B2 5/2019 Li et al.
2016/0014812 A1 1/2016 Park et al.
(Continued)

FOREIGN PATENT DOCUMENTS

WO 2018/004322 A1 1/2018
WO 2018/029023 A1 2/2018

OTHER PUBLICATIONS

Huawei, "Feature lead summary for AI 7.2.4.3: Uu-based sidelink resource allocation/configuration", 3GPP TSG RAN WG1 Meeting #96 R1-1903572, Athens, Greece, Feb. 25-Mar. 1, 2019.
(Continued)

*Primary Examiner* — Angel T Brockman
(74) *Attorney, Agent, or Firm* — LRK PATENT LAW FIRM

(57) ABSTRACT

A method for reporting sidelink HARQ response information, performed by a terminal, includes the steps of: receiving, from a base station, information on allocation of a PSSCH resource for PSSCH transmission; determining a PSFCH resource for PSFCH reception corresponding to the PSSCH transmission; determining a transmission time point of HARQ response information corresponding to the PSSCH transmission; and transmitting the HARQ response information, corresponding to the PSSCH transmission, to the base station at the determined time point, wherein the transmission time point of the HARQ response information
(Continued)

is expressed as a time offset, L, from a time point of the PSFCH resource, and information on the transmission time point of the HARQ response information is transmitted from the base station to the terminal.

17 Claims, 11 Drawing Sheets

(30) Foreign Application Priority Data

Jul. 4, 2019 (KR) .................. 10-2019-0080873
Jul. 9, 2019 (KR) .................. 10-2019-0082722

(51) Int. Cl.
*H04L 1/1829* (2023.01)
*H04L 1/1867* (2023.01)
*H04W 72/23* (2023.01)

(52) U.S. Cl.
CPC .......... *H04L 1/1887* (2013.01); *H04L 1/1893* (2013.01); *H04W 72/21* (2023.01); *H04W 72/23* (2023.01)

(58) Field of Classification Search
USPC ........................................... 370/329
See application file for complete search history.

(56) References Cited

U.S. PATENT DOCUMENTS

| | | |
|---|---|---|
| 2017/0156143 A1 | 6/2017 | Chang et al. |
| 2018/0220280 A1 | 8/2018 | Baghel |
| 2019/0052436 A1 | 2/2019 | Desai et al. |
| 2019/0103947 A1 | 4/2019 | Park |
| 2019/0229853 A1 | 7/2019 | Lee et al. |
| 2019/0254091 A1 | 8/2019 | Kim et al. |
| 2020/0029318 A1* | 1/2020 | Guo ............... H04W 76/14 |
| 2020/0136760 A1* | 4/2020 | Hahn .............. H04W 72/04 |

OTHER PUBLICATIONS

Huawei et al., "Sidelink physical layer procedures for NR V2X", 3GPP TSG RAN WG1 Meeting #97 R1-1906008, Reno, USA, May 13-17, 2019.
ZTE, Sanechips, "NR sidelink physical layer structure", 3GPP TSG RAN WG1 Meeting #97 R1-1906457, Reno, USA, May 13-17, 2019.
LG Electronics, "Discussion on resource allocation for NR sidelink Mode 1", 3GPP TSG RAN WG1 Meeting #97 R1-1907013, Reno, USA, May 13-17, 2019.
Search Report, mailed Sep. 17, 2020, for International Application No. PCT/KR2020/007442.
Written Opinion, mailed Sep. 17, 2020, for International Application No. PCT/KR2020/007442.

* cited by examiner

METHOD AND APPARATUS FOR SIDELINK COMMUNICATION

CROSS-REFERENCE TO RELATED APPLICATIONS

The present application is a U.S. National Phase entry from International Application No. PCT/KR2020/007442, filed on Jun. 9, 2020, which claims priority to Korean Patent Application No. 10-2019-0070763, filed on Jun. 14, 2019, No. 10-2019-0078976, filed on Jul. 1, 2019, No. 10-2019-0080873, filed on Jul. 4, 2019, and No. 10-2019-0082722, filed on Jul. 9, 2019, the disclosure of which is incorporated by reference herein in their entirety.

TECHNICAL FIELD

The present invention relates to device-to-device communication or sidelink communication, and more specifically, to methods for transmitting and receiving signals between a base station and a terminal or between terminals in a mobile communication system supporting the sidelink communication, and apparatuses therefor.

BACKGROUND ART

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also a frequency band above 6 GHz, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like, and various technical requirements for supporting them should be satisfied.

Direct communication between terminals is a communication scheme in which adjacent terminals transmit and receive signals directly to each other without intervention of a base station. The direct communication may be classified into a scheme performed without network control mainly in an unlicensed band such as Wi-Fi or Bluetooth, or a scheme based on a cellular communication system (e.g., LTE system, NR system, etc.). In particular, the cellular-based scheme can increase spectral efficiency, perform interference and collision control, and support QoS through proper intervention of a base station or network, and provide various combinational scenarios with the cellular communication, so that it is expected to be used widely in fields such as vehicle communication, Internet of things, and the like. Accordingly, there is a need for an efficient signal transmission/reception method between terminals for the cellular-based direct communication between terminals and a signal transmission method and procedure for the base station to control the direct communication.

DISCLOSURE

Technical Problem

An objective of the present invention for solving the above-described problem is directed to providing a method for reporting sidelink HARQ-ACK/NACK information and a method for receiving sidelink HARQ-ACK/NACK information.

Another objective of the present invention for solving the above-described problem is directed to providing an apparatus (e.g., base station or terminal) performing the method for reporting sidelink HARQ-ACK/NACK information and/or the method for receiving sidelink HARQ-ACK/NACK information.

Technical Solution

An exemplary embodiment of the present invention for achieving the objective, as a method for reporting sidelink hybrid automatic repeat request (HARD) response information performed by a terminal, may comprise receiving allocation information of a physical sidelink shared channel (PSSCH) resource for transmission of a PSSCH from a base station; determining a physical sidelink feedback channel (PSFCH) resource for reception of a PSFCH corresponding to the transmission of the PSSCH; determining a time point of transmitting HARQ response information corresponding to the transmission of the PSSCH; and transmitting the HARQ response information corresponding to the transmission of the PSSCH to the base station at the determined time point, wherein the time point of transmitting the HARQ response information is represented by a time offset L from a time point of the PSFCH resource, and information on the time point of transmitting the HARQ response information is transmitted from the base station to the terminal.

The time offset L (L is an integer equal to or greater than 0) may mean a number of slot(s), and when the time point of the PSFCH resource is a slot n, the time point of transmitting the HARQ response information may be determined as a slot (n+L).

Each of the slot n and the slot (n+L) may be one of slots in an uplink carrier or an uplink bandwidth part through which the HARQ response information is transmitted, the number of slot(s) indicated by the time offset L may be a number of slot(s) of the uplink carrier or uplink bandwidth part, and the slot n may be one of slot(s) of the uplink carrier or uplink bandwidth part, which overlap with the PSFCH resource.

The HARQ response information may be transmitted to the base station through a physical uplink control channel (PUCCH) or a physical uplink shared channel (PUSCH).

The HARQ response information may include acknowledgment (ACK), may include negative ACK (NACK), or may include either ACK or NACK.

The PSSCH resource may be a PSSCH resource scheduled by a dynamic grant or a PSSCH resource scheduled by a configured grant.

The PSFCH resource may be an earliest PSFCH resource among PSFCH resources appearing from a slot after K (K is an integer equal to or greater than 0) slot(s) from a slot to which the PSSCH resource belongs, and K may be a predefined value, a value configured by the base station to the terminal, or a value preconfigured to the terminal.

The K slot(s) may be slot(s) belonging to a sidelink resource pool for the transmission of the PSSCH.

The method may further comprise transmitting, by the terminal, the PSSCH to a counterpart terminal through the PSSCH resource; and receiving, by the terminal, the PSFCH from the counterpart terminal through the PSFCH resource.

The PSFCH may include reception response information for the PSSCH, and the HARQ response information may be generated based on the reception response information for the PSSCH received through the PSFCH.

Another exemplary embodiment of the present invention for achieving the objective, as a method for receiving sidelink hybrid automatic repeat request (HARQ) response information performed by a base station, may comprise transmitting allocation information of a physical sidelink shared channel (PSSCH) resource for transmission of a PSSCH to a terminal; determining a physical sidelink feedback channel (PSFCH) resource for the terminal to receive a PSFCH corresponding to the transmission of the PSSCH; determining a time point of receiving HARQ response information corresponding to the transmission of the PSSCH; and receiving the HARQ response information corresponding to the transmission of the PSSCH from the terminal at the determined time point, wherein the time point of receiving the HARQ response information is represented by a time offset L from a time point of the PSFCH resource for the terminal to receive the PSFCH corresponding to the transmission of the PSSCH, and information on the time point of receiving the HARQ response information is transmitted from the base station to the terminal.

The time offset L (L is an integer equal to or greater than 0) may mean a number of slot(s), and when the time point of the PSFCH resource is a slot n, the time point of receiving the HARQ response information may be determined as a slot (n+L).

Each of the slot n and the slot (n+L) is one of slots may be an uplink carrier or an uplink bandwidth part through which the HARQ response information is received, the number of slot(s) indicated by the time offset L may be a number of slot(s) of the uplink carrier or uplink bandwidth part, and the slot n may be one of slot(s) of the uplink carrier or uplink bandwidth part, which overlap with the PSFCH resource.

The HARQ response information may be received from the terminal through a physical uplink control channel (PUCCH) or a physical uplink shared channel (PUSCH).

The PSFCH resource may be an earliest PSFCH resource among PSFCH resources appearing from a slot after K (K is an integer equal to or greater than 0) slot(s) from a slot to which the PSSCH resource belongs, and K may be a predefined value, a value configured by the base station to the terminal, or a value preconfigured to the terminal.

The K slot(s) may be slot(s) belonging to a sidelink resource pool for the transmission of the PSSCH.

An exemplary embodiment of the present invention for achieving another objective, as a terminal performing sidelink communication, may comprise a processor; a memory electronically communicating with the processor; and at least one instruction stored in the memory and executable by the processor, wherein when executed by the processor, the at least one instruction cause the terminal to: receive allocation information of a physical sidelink shared channel (PSSCH) resource for transmission of a PSSCH from a base station; determine a physical sidelink feedback channel (PSFCH) resource for reception of a PSFCH corresponding to the transmission of the PSSCH; determine a time point of transmitting HARQ response information corresponding to the transmission of the PSSCH; and transmit the HARQ response information corresponding to the transmission of the PSSCH to the base station at the determined time point, wherein the time point of transmitting the HARQ response information is represented by a time offset L from a time point of the PSFCH resource, and information on the time point of transmitting the HARQ response information is transmitted from the base station to the terminal.

The time offset L (L is an integer equal to or greater than 0) may mean a number of slot(s), and when the time point of the PSFCH resource is a slot n, the time point of transmitting the HARQ response information may be determined as a slot (n+L).

Each of the slot n and the slot (n+L) may be one of slots in an uplink carrier or an uplink bandwidth part through which the HARQ response information is transmitted, the number of slot(s) indicated by the time offset L may be a number of slot(s) of the uplink carrier or uplink bandwidth part, and the slot n may be one of slot(s) of the uplink carrier or uplink bandwidth part, which overlap with the PSFCH resource.

The PSFCH resource may be an earliest PSFCH resource among PSFCH resources appearing from a slot after K (K is an integer equal to or greater than 0) slot(s) from a slot to which the PSSCH resource belongs, and K may be a predefined value, a value configured by the base station to the terminal, or a value preconfigured to the terminal.

Advantageous Effects

According to the exemplary embodiments of the present invention as described above, a sidelink feedback signal can be efficiently transmitted and received between terminals or between a terminal and a base station in a sidelink communication system.

MODES OF THE INVENTION

Figure 1:
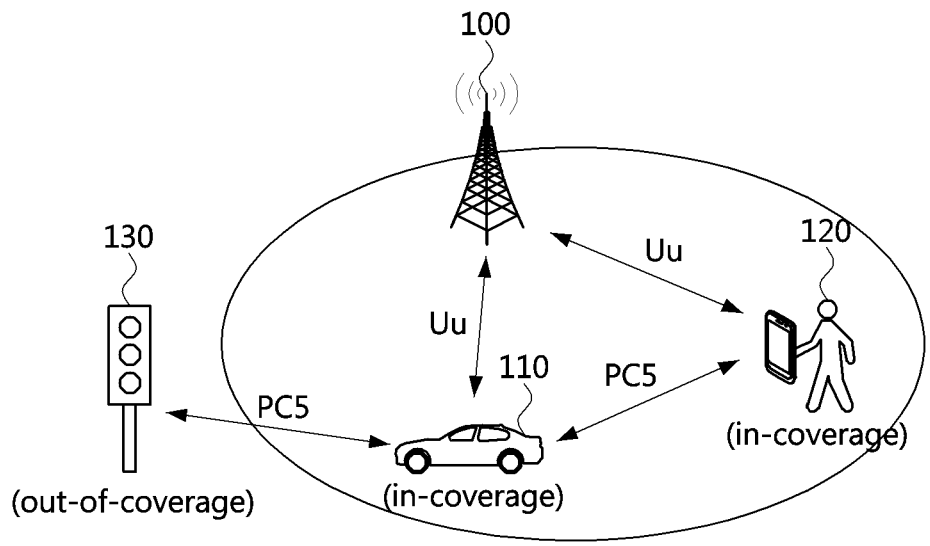
FIG. 1 is a conceptual diagram illustrating scenarios of sidelink communication to which exemplary embodiments of the present invention are applied.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferable exemplary embodiments of the present invention will be described in greater detail with reference to the accompanying drawings.

Hereinafter, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

The present invention relates to direct communication (device-to-device communication) between terminals or sidelink communication, and more specifically, to methods for transmitting and receiving signals between a base station and a terminal or between terminals in a communication system supporting the direct communication between terminals, and apparatuses supporting the same. For convenience of description, a 3GPP new radio (NR) communication system will be described as an example of the communication system to which exemplary embodiments according to the present invention are applied, but the spirits or exemplary embodiments of the present invention are not limited thereto and may be applied to various communication systems.

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in the frequency band of 6 GHz or below, and support a carrier bandwidth of up to 400 MHz in the frequency band of 6 GHz or above.

In order to satisfy various technical requirements, a numerology applied to physical signals and channels in the NR communication system may vary. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have a power of two multiplication relationship, and the CP length may be scaled at the same ratio as the OFDM symbol length. Depending on a frequency band in which the communication system operates, some of the numerologies of Table 1 may be supported. When the subcarrier spacing is 60 kHz, an extended CP may be additionally supported.

TABLE 1

| Subcarrier spacing | 15 kHz | 30 kHz | 60 kHz | 120 kHz | 240 kHz |
|---|---|---|---|---|---|
| OFDM symbol length [μs] | 66.7 | 33.3 | 16.7 | 8.3 | 4.2 |
| CP length [μs] | 4.76 | 2.38 | 1.19 | 0.60 | 0.30 |
| Number of OFDM symbols within 1 ms | 14 | 28 | 56 | 112 | 224 |

In the following description, a frame structure in the communication system (e.g., NR communication system) will be described. In the time domain, a building block may be a subframe, a slot, a mini-slot, and the like. The subframe may be used as a transmission unit, and the length of the subframe may have a fixed value (e.g., 1 ms) regardless of the subcarrier spacing. The slot may comprise consecutive symbols (e.g., 14 OFDM symbols). The length of the slot may be variable differently from the length of the subframe, and may be inversely proportional to the subcarrier spacing. The slot may be used as a scheduling unit and may be used as a configuration unit of scheduling and hybrid automatic repeat request (HARD) timing. However, a scheduling interval or a transmission duration may not necessarily match the length of the slot. The base station may schedule a data channel (e.g., physical downlink shared channel (PDSCH)) to the terminal by using some or all of the symbols constituting a slot, or may schedule a data channel by using a plurality of slots.

The mini-slot may refer to a time unit having a shorter length than a slot. The mini-slot based scheduling may be used for transmission of a partial slot, URLLC transmission, analog beamforming based multi-user scheduling, etc. in an unlicensed band or in a band where the NR and the LTE coexist. The NR may support the mini-slot-based transmission by configuring a physical downlink control channel (PDCCH) monitoring periodicity and a duration of a data channel shorter than a slot.

In the NR communication system, a frequency domain building block of a frame structure may include a resource block (RB), a subcarrier, and the like. One RB may include consecutive subcarriers. For example, one RB may consist of 12 consecutive subcarriers. The number of subcarriers constituting one RB may be constant regardless of a numerology. In this case, a bandwidth occupied by one RB may be proportional to a subcarrier spacing of the numerology. The RB may be used as a frequency domain resource allocation unit for a control channel and a data channel. In case of a downlink control channel, the minimum unit of resource allocation is a control channel element (CCE), and one CCE may include one or a plurality of RBs. The resource allocation of the data channel may be performed in units of RBs or in units of RB group(s) (e.g., resource block group (RBG)). One RBG may include one or a plurality of consecutive RBs.

In exemplary embodiments, the RB may mean a common RB (CRB). Alternatively, the RB may mean a physical RB (PRB) or a virtual RB (VRB). In the communication system (e.g., NR communication system), the CRB may mean an RB constituting a set of RBs (i.e., a common RB grid) that are consecutively arranged based on a reference frequency (e.g., point A). A carrier, a bandwidth part, and the like may be arranged on the common RB grid. That is, the carrier, the bandwidth part, etc. may be composed of at least one CRB. Meanwhile, the RB constituting the bandwidth part may be referred to as a PRB, and each PRB may correspond to a CRB. Within the bandwidth part, a CRB index may be properly converted to a PRB index. In some exemplary embodiments, the RB may mean an interlace RB (IRB). In exemplary embodiments, the PRB may mean a CRB, a VRB, or the like corresponding to the PRB. In addition, the CRB may mean a PRB, a VRB, or the like corresponding to the CRB.

The slot (e.g., slot format) may be composed of a combination of one or more among a downlink period, a flexible (or unknown) period, and an uplink period. Each period may consist of one or a plurality of consecutive symbols. The flexible period may be inserted between the downlink period and the uplink period, between the downlink period and the downlink period, between the uplink period and the uplink period, or the like. When the flexible period is inserted between the downlink period and the uplink period, the flexible period may be used as a guard period.

One slot may include one or more flexible periods. Alternatively, one slot may not include a flexible period. In addition, the flexible period may be used to perform an uplink or downlink operation according to configuration from a base station or terminal. The slot format may be configured to the terminal semi-statically by higher layer signaling or may be dynamically indicated by physical layer signaling (e.g., downlink control information (DCI), slot format indicator (SFI)).

Although not specifically mentioned herein, signaling may refer to physical layer signaling (e.g., DCI), medium access control (MAC) layer signaling (e.g., MAC control element (CE)), RRC layer signaling (e.g., master information block (MIB), system information block (SIB), cell-specific RRC signaling, UE-specific RRC signaling, etc.), or the like, and may refer to a combination of two or more signaling among the signaling. Also, a signaling procedure may be performed between the base station and the terminal, between the terminal and the terminal, and between the base station and the base station. The signaling between the base station and the terminal and between the terminal and the terminal will be mainly considered in the present disclosure.

In the present disclosure, unless otherwise specified, configuration may mean configuration by a signaling procedure between communication nodes in some cases, may mean preconfiguration not based on a signaling procedure, or may mean both the cases. As an example of the preconfiguration, some information (or parameters) used to perform communication may be stored in advance in the terminal. These may be stored in the terminal through a medium such as a universal IC card (UICC), a subscriber identity module (SIM), or a universal SIM (USIM), or may be stored directly in a mobile equipment (ME). Particularly, unless otherwise specified, the expression that the terminal is configured with certain information may include all the meanings of configuration from the base station, configuration from another terminal, preconfiguration, and the like. In addition, for convenience of description, 'signaling' of certain information to a communication node may mean configuration of the certain information, and as described above, this may also be interpreted as preconfiguration of the certain information. Particularly, the expression that the terminal is configured with certain information from the base station may include the meaning that the certain information is signaled from the base station through a radio link (e.g., a Uu interface to be described later), and further include the meaning that the certain information is configured or preconfigured by the base station (or network) or a service provider operating the same.

In addition, in the present disclosure, a signal may be used to mean both a physical layer signal and a channel. For example, a downlink signal may include a downlink signal and a downlink channel of a physical layer, for example, a PDCCH, a PDSCH, a DM-RS, a channel state information reference signal (CSI-RS), a phase tracking reference signal (PT-RS), a synchronization signal/physical broadcast channel (SS/PBCH) block, and the like. In addition, an uplink signal may include an uplink signal and an uplink channel of the physical layer, for example, a physical uplink control channel (PUCCH), a PUSCH, a DM-RS, a sounding reference signal (SRS), a PT-RS, a PRACH (physical random access channel), and the like. In addition, a sidelink signal may include a sidelink signal and a sidelink channel of the physical layer, for example, a physical sidelink control channel (PSCCH), a physical sidelink shared channel (PSSCH), a physical sidelink feedback channel (PSFCH), a physical sidelink discovery channel (PSDCH), a physical sidelink broadcast channel (PSBCH), a DM-RS, a CSI-RS, a PT-RS, and the like.

The terminal may perform a downlink operation, an uplink operation, a sidelink operation, etc. in the bandwidth part. The bandwidth part may be defined as a set of consecutive PRBs in the frequency domain. A terminal performing an initial access procedure may obtain configuration information of an initial bandwidth part from the base station through system information. A terminal operating in an RRC connected state may acquire configuration information of a bandwidth part from the base station through terminal-specific higher layer signaling. The configuration information of the bandwidth part may include a numerology (e.g., subcarrier spacing and CP length) applied to the bandwidth part. In addition, the configuration information of the bandwidth part may include information indicating a position of a start PRB of the bandwidth part and information indicating the number of PRBs constituting the bandwidth part. At least one bandwidth part among bandwidth part(s) configured in the terminal may be activated. The base station may configure a plurality of bandwidth parts to the terminal within one carrier, and switch the active bandwidth part. Switching of the bandwidth part may be configured by semi-static signaling (e.g., RRC signaling) or may be indicated by physical layer dynamic signaling (e.g., DCI). In addition, the switching of the bandwidth part may be performed based on a timer.

In the mobile communication system (e.g., LTE or NR), a link formed between a terminal and a terminal for direct communication between terminals may be referred to as a sidelink to be distinguished from uplink and downlink. A source terminal may directly transmit data to a target terminal (or destination terminal) without going through a base station through the sidelink. In this case, the source terminal and the target terminal may correspond to a transmitting terminal and a receiving terminal, respectively. The sidelink transmissions may include broadcast, groupcast (or multicast), and unicast transmissions. In case of the broadcast and groupcast, the source terminal may transmit the same data to a plurality of target terminals by using the same signal. The direct communication between terminals may also be referred to as sidelink communication, sidelink transmission, device-to-device (D2D) communication, or the like.

A typical application example of the direct communication between terminals is vehicle-to-everything (V2X) communication for vehicles. The V2X communication is a communication scheme that enables various services such as accident prevention, platooning, and provision of infotainment by communicating with vehicles and objects nearby. The V2X includes vehicle-to-vehicle (V2V) communication between vehicles, vehicle-to-infrastructure (V2I) communication between vehicles and infrastructure, and vehicle-to-pedestrian (V2P) communication between vehicles and pedestrians, and they may all correspond to the direct communication between terminals. Since communication for a vehicle traveling at a high speed should basically ensure high transmission reliability and high mobility of a terminal, it is essential to consider these requirements in designing a direct communication system between terminals.

FIG. 1 is a conceptual diagram illustrating scenarios of sidelink communication to which exemplary embodiments of the present invention are applied.

Referring to FIG. 1, a link among terminals 110, 120, and 130 may be defined as a PC5 interface, and a link between each terminal and the base station 100 may be defined as a Uu interface. The first terminal 110 and the second terminal 120 may be terminals located in the coverage of the base station (i.e., in-coverage), and the third terminal 130 may be located outside the coverage of the base station (i.e., out-of-coverage). The first terminal 110, the second terminal 120, and the third terminal 130 may exchange data with each other through the PC5 interface (i.e., sidelink), and the first terminal 110 and the second terminal 120 located within the coverage of the base station may exchange data with the base station 100 through the Uu interface.

A source terminal may transmit sidelink data, that is, a transport block (TB), to a target terminal through a physical sidelink shared channel (PSSCH). One PSSCH may include one TB. Alternatively, one PSSCH may include at least one TB (e.g., 1 or 2 TBs). In this case, two modes may be considered as a method of allocating a sidelink resource for a PSSCH.

The first mode (i.e., mode 1) is a scheme in which sidelink resource allocation is performed by the base station, and the base station may determine a sidelink resource through which a PSSCH is to be transmitted and transmit resource allocation and scheduling information to the source terminal through a Uu downlink. The source terminal may request a sidelink resource from the base station in order to be allocated a PSSCH resource from the base station. For example, the source terminal may transmit a scheduling request (SR) (or sidelink SR), a buffer status report (BSR) (or sidelink BSR), or the like to the base station to request a sidelink resource from the base station. The source terminal may transmit a PSSCH to the target terminal through the sidelink resource allocated by the base station based on the resource allocation and scheduling information. In this case, the source terminal may transmit the resource allocation and scheduling information of the PSSCH to the target terminal together with the PSSCH, or may transmit the resource allocation and scheduling information of the PSSCH to the target terminal in advance separately from the PSSCH. For example, the information may be included in sidelink control information (SCI) and transmitted through a physical sidelink control channel (PSCCH). For another example, the information may be included in a first SCI or a second SCI constituting a 2-stage SCI, and transmitted through the PSCCH, the PSSCH, a resource defined for the second SCI transmission, or the like. A SCI format may be defined for the SCI transmission. In addition, according to the first mode, resources of other sidelink signals and channels (e.g., PSCCH, channel state information-reference signal (CSI-RS), physical sidelink feedback channel (PSFCH), etc.) as well as the PSSCH may be determined by the base station, and related configuration information may be signaled to the terminal.

On the other hand, the second mode (i.e., mode 2) may be a scheme in which sidelink resource allocation is performed by the terminal (e.g., source terminal). The terminal may determine available resource regions within a sidelink resource pool through energy sensing (e.g., sensing using signals received through sidelink resources), allocate a PSSCH to a part or all of the available resource regions, and transmit the PSSCH to the target terminal. As in the first mode, the source terminal may transmit resource allocation and scheduling information of the PSSCH to the target terminal together with the PSSCH, or may transmit the resource allocation and scheduling information of the PSSCH to the target terminal in advance separately from the PSSCH.

The first mode may be used when the source terminal belongs to the coverage of the base station. Referring to FIG. 1, the first terminal 110 may transmit the PSSCH to the second terminal 120 and the third terminal 130 by the first mode under assistance of the base station 100. Further, the second terminal 120 may transmit the PSSCH to the first terminal 110 by the first mode under assistance of the base station 100. On the other hand, the second mode may be used both when the source terminal is located within the coverage of the base station and when it is located outside the coverage of the base station. Referring to FIG. 1, the first terminal 110 may transmit the PSSCH to the second terminal 120 and the third terminal 130 by the second mode, and the second terminal 120 may transmit the PSSCH to the first terminal 110 by the second mode. In addition, the third terminal 130 located outside the coverage of the base station 100 also may transmit the PSSCH to the first terminal 110 by the second mode.

Meanwhile, a sidelink bandwidth part may be configured to the terminal for sidelink transmission. The sidelink bandwidth part may be configured for each carrier. The sidelink bandwidth part may be configured to have a single numerology and consecutive PRB(s), similarly to the bandwidth part of the Uu interface. In addition, the sidelink bandwidth part may include one or a plurality of subchannels in the frequency domain. Each subchannel may be composed of one or a plurality of consecutive PRB(s), and the number of PRBs per subchannel may be predefined in the technical specification or configured to the terminal.

For fast switching between the sidelink (i.e., PC5 interface) and the Uu interface, the sidelink bandwidth part (e.g., active sidelink bandwidth part) may be configured to have the same numerology as that of the Uu uplink bandwidth part (e.g., Uu active uplink bandwidth part) and/or the Uu downlink bandwidth part (e.g., Uu active downlink bandwidth part). When the numerology of the sidelink bandwidth part is different from the numerology of the Uu uplink (or Uu downlink) bandwidth part, for example, when it is impossible to apply the same numerology to the sidelink bandwidth part and the uplink (or downlink) bandwidth part, the sidelink bandwidth part may be deactivated. The sidelink bandwidth part may be configured specifically for the serving cell. For example, configuration information of the sidelink bandwidth part may be included in a master information block (MIB), system information block 1 (SIB1), or other system information (OSI), and transmitted from the base station to the terminal. In addition, the terminal in the RRC connected state may be configured with the sidelink bandwidth part through terminal-specific configuration (e.g., terminal-specific RRC signaling). Alternatively, the sidelink bandwidth part may be configured for each serving cell group or each base station group, and the same sidelink bandwidth part configuration may be applied within the serving cell group or base station group.

The terminal may be configured with one or a plurality of sidelink resource pools. The sidelink resource pool may be configured for each carrier, and each sidelink resource pool may be allocated in the sidelink bandwidth part. Each sidelink resource pool may consist of one or more contiguous subchannel(s) in the frequency domain. In addition, each sidelink resource pool may be composed of a set of slots in the time domain. The sidelink resource pool may have periodicity, and may include at least one slot(s) within one period. At least one symbol(s) may be included within each slot included in the sidelink resource pool. That is, some symbols (e.g., downlink symbols, symbols through which SS/PBCH blocks, a CORESET #0, a search space set #0, etc. are transmitted, symbols not configured for the sidelink resource pool) within each slot included in the sidelink resource pool may not be included in the sidelink resource pool. The terminal may transmit and receive a sidelink signal (e.g., PSSCH, PSCCH, PSFCH, sidelink CSI-RS, etc.) in the sidelink resource pool. The terminal may obtain information on the configuration of the sidelink bandwidth part and the sidelink resource pool through signaling from the base station or preconfiguration.

HARQ-ACK Timing Indication Method

In case of groupcast transmission and unicast transmission, a target terminal may transmit information on whether a PSSCH has been successfully received (i.e., HARQ-Acknowledgement (ACK) corresponding to the PSSCH) to a source terminal. The HARQ-ACK for the PSSCH may be referred to as 'sidelink HARQ-ACK', which may be transmitted from the target terminal to the source terminal through a PSFCH. The sidelink HARQ-ACK information may include ACK or negative acknowledgment (NACK), and in some cases (e.g., in case of groupcast transmission), may include only NACK. Specifically, terminals receiving groupcast data from the source terminal may transmit sidelink HARQ-ACK information including NACK to the source terminal through a group-common sidelink resource when PSSCH reception fails. The group-common sidelink resource may be a PSFCH. That is, the terminal may transmit the HARQ-ACK including NACK through the PSFCH. Alternatively, the group-common sidelink resource may be a sidelink signal or channel other than the PSFCH. In addition to the ACK/NACK information, discontinuous transmission (DTX) information may be included in the sidelink HARQ-ACK information. Hereinafter, the sidelink HARQ-ACK may mean HARQ-ACK for one PSSCH or HARQ-ACK for a plurality of PSSCHs.

When the first mode sidelink resource allocation is performed, the source terminal may report the sidelink HARQ-ACK received from the target terminal or information corresponding thereto to the base station. In addition, when the source terminal expecting to receive the sidelink HARQ-ACK from the target terminal does not receive the corresponding sidelink HARQ-ACK (e.g., when PSFCH reception fails), the source terminal may generate sidelink HARQ-ACK information corresponding to the PSSCH based on a predefined rule, and report the generated sidelink HARQ-ACK information to the base station. In addition, when the source terminal does not expect to receive the sidelink HARQ-ACK from the target terminal, the source terminal may generate sidelink HARQ-ACK information corresponding to the PSSCH arbitrarily or based on a predefined rule, and report the generated sidelink HARQ-ACK information to the base station. For example, when the source terminal performs PSSCH transmission based on blind retransmission, the source terminal may not receive an HARQ-ACK response from the target terminal. In this case, the source terminal may transmit NACK to the base station for a purpose of requesting a retransmission resource for the corresponding PSSCH, otherwise it may transmit ACK. In addition, when the source terminal does not transmit the PSSCH through the PSSCH resource (e.g., configured grant PSSCH resource) allocated from the base station, the source terminal may generate sidelink HARQ-ACK information corresponding to the PSSCH resource based on a predefined rule, and report the generated sidelink HARQ-ACK information to the base station.

Hereinafter, information for reporting a sidelink HARQ-ACK corresponding to a PSSCH or PSSCH resource allocated by the source terminal to the base station may be expressed as 'sidelink HARQ-ACK report information'. The sidelink HARQ-ACK report information may be transmitted through a Uu uplink channel (e.g., PUCCH, PUSCH, etc.). The base station may determine whether to perform scheduling for retransmission of the corresponding PSSCH based on the sidelink HARQ-ACK report information received from the source terminal.

Figure 2:
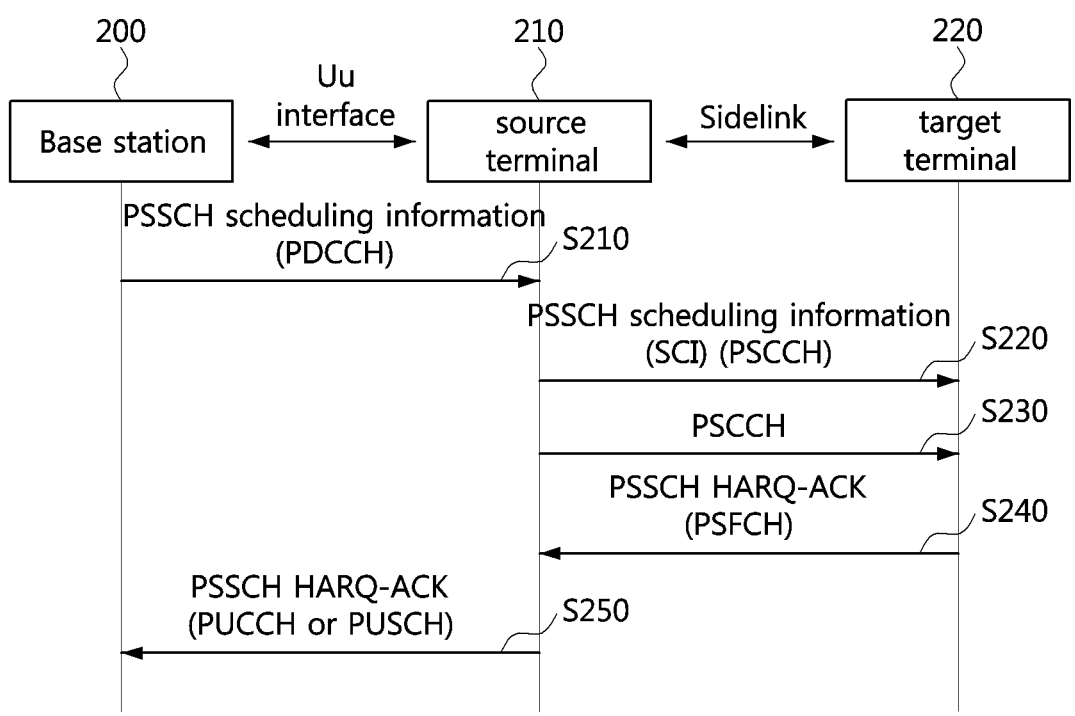
FIG. 2 is a sequence chart illustrating a signal transmission procedure for a first mode sidelink resource allocation.

FIG. 2 is a sequence chart illustrating a signal transmission procedure for a first mode sidelink resource allocation.

Referring to FIG. 2, a base station 200 may transmit scheduling information for a PSSCH (hereinafter, 'PSSCH scheduling information') to a source terminal 210 through a Uu downlink (e.g., PDCCH, PDSCH, a resource defined for transmission of a second DCI in a 2-stage DCI, etc.) (S210). The source terminal 210 may transmit PSSCH scheduling information generated based on the PSSCH scheduling information received from the base station 200 to a target terminal 220 through a sidelink (e.g., PSCCH, PSSCH, a resource defined for transmission of a second SCI in a 2-stage SCI, etc.) (S220). In this case, the source terminal 210 may transmit a part or all of the PSSCH scheduling information received from the base station 200 to the target terminal 220, or transmit PSSCH scheduling information generated based on a part or all of the PSSCH scheduling information received from the base station 200 to the target terminal (220). Alternatively, the source terminal 210 may transmit other information together with the PSSCH scheduling information to the target terminal 220. The source terminal 210 may transmit a PSSCH to the target terminal 220 through a sidelink based on the PSSCH scheduling information transmitted to the target terminal 220 (S230). The target terminal 220 may receive the PSSCH and transmit an HARQ-ACK for the PSSCH to the source terminal 210 through a sidelink (e.g., PSFCH, a resource defined for transmission of a sidelink HARQ-ACK composed only of NACK, etc.) (S240). Finally, the source terminal 210 may transmit sidelink HARQ-ACK report information corresponding to the PSSCH to the base station 200 through a Uu uplink (e.g., PUCCH, PUSCH, etc.) (S250). In this case, the source terminal 210 may generate the sidelink HARQ-ACK report information by using or processing a part or all of the sidelink HARQ-ACK received from the target terminal 220, or generate the sidelink HARQ-ACK report information without using the sidelink HARQ-ACK received from the target terminal 220. The source terminal may transmit information other than the sidelink HARQ-ACK report information to the base station 200 together with the sidelink HARQ-ACK report information.

At least some of the steps S210 to S250 in the above-described procedure may be omitted. For example, when the target terminal and/or the source terminal is configured not to perform HARQ-ACK feedback in the groupcast transmission and the unicast transmission, or in case of the broadcast transmission, the steps S240 and/or steps S250 may be omitted. For another example, in case of the configured-grant based PSSCH transmission, the steps S210 and/or S220 may be omitted. In addition, some steps in the above-described procedure may be performed several times repeatedly. For example, in the case of the configured grant-based PSSCH transmission, the step S210 may be performed once, and accordingly, the steps S220 to S250 may be repeated several times. Alternatively, the steps S210 and S220 may be performed once, and accordingly, the steps S230 to S250 may be repeated several times.

In the above-described procedure, the PSSCH (and PSCCH) and the corresponding PSFCH may be transmitted in the same sidelink bandwidth part. In addition, the PSSCH (and PSCCH) and the PSFCH may be transmitted in the same sidelink resource pool. For example, the source terminal may perform a transmission operation of the PSSCH (and PSCCH) and a reception operation of the PSFCH in the same sidelink resource pool. In addition, the target terminal may perform a reception operation of the PSSCH (and PSCCH) and a transmission operation of the PSFCH in the same sidelink resource pool. Meanwhile, when a terminal aggregates and uses a plurality of sidelink carriers, in the above-described procedure, the PSSCH (and PSCCH) and the corresponding PSFCH may be transmitted in different carriers and different sidelink bandwidth parts. In addition, the PSSCH (and PSCCH) and the PSFCH may be transmitted in different sidelink resource pools on the same carrier or different carriers.

The PSFCH resource (or PSFCH transmission occasion resource) configured to the terminal may have periodicity. When at least one PSFCH resource(s) exists within one slot, a PSFCH resource may mean each PSFCH resource or a set of PSFCH resource(s) in the same slot depending on a situation. The periodicity of the PSFCH resource may be set to N slot(s) or M symbol(s) (where N and M are natural numbers). The terminal may constitute PSFCH resources for each sidelink bandwidth part or for each sidelink resource pool. Depending on the configuration, PSFCH resources may not exist in some sidelink resource pools.

Figure 3:
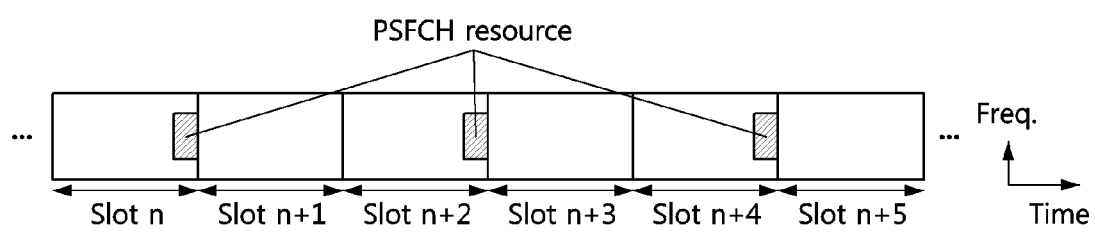
FIG. 3 is a conceptual diagram illustrating a first exemplary embodiment of periodic PSFCH resource configuration.

FIG. 3 is a conceptual diagram illustrating a first exemplary embodiment of periodic PSFCH resource configuration.

Referring to FIG. 3, the terminal may be configured with PSFCH resource(s) from the base station. The PSFCH resource(s) may be configured for a specific sidelink bandwidth part and/or a specific sidelink resource pool configured in the terminal. The periodicity of the PSFCH resource(s) may be 2 slots (i.e., N=2). That is, PSFCH resources may be configured in every second slot (e.g., slot n, slot (n+2), slot (n+4), etc.). In addition, the PSFCH resources may be mapped to the same time-frequency resource in every N-th slot. Referring to FIG. 3, each of the plurality of PSFCH resources may be allocated in the same symbol(s) (e.g., the last symbol(s)) within each corresponding slot and may be composed of the same PRB(s).

The target terminal may transmit a PSFCH to the source terminal through one of the PSFCH resources that appear from a time point after a predetermined time from a time point when the PSSCH is received from the source terminal. For example, the target terminal may transmit a PSFCH in the earliest PSFCH resource among PSFCH resources that appear from the time point after the predetermined time from the time point when the PSSCH is received. The PSSCH and the PSFCH may be transmitted in the same sidelink bandwidth part and/or the same sidelink resource pool. Alternatively, in case of carrier aggregation, the PSSCH and the PSFCH may be transmitted in different sidelink bandwidth parts and/or different sidelink resource pools.

The predetermined time may correspond to a PSSCH reception processing time and a PSFCH transmission preparation time of the terminal, or may be a value determined in consideration of at least these. The predetermined time may be defined in the technical specification or configured by the base station to the terminal. The predetermined time may be expressed as a time distance or a time offset (e.g., symbol offset or slot offset) between the PSSCH reception time point and the PSFCH transmission time point. For example, when a slot in which the target terminal receives the PSSCH (and/or PSCCH) is a slot n, the target terminal may transmit the PSFCH in a PSFCH resource of the earliest slot where the PSFCH resource is present among a slot (n+L) and subsequent slots. In this case, L may be a natural number, may be predefined in the technical specification and shared with the source terminal, the target terminal, and/or the base station. Alternatively, L may be configured by the base station to the terminal or by one terminal (e.g., source terminal) to another terminal (e.g., target terminal). When the numerology (e.g., subcarrier spacing) of the resource pool in which the PSSCH is transmitted is different from that of the resource pool in which the PSFCH is transmitted, the slot may be interpreted as a slot of one among the two resource pools. When determining a PSFCH transmission timing, an uplink timing advance (TA) of the terminal may be considered together.

Figure 4:
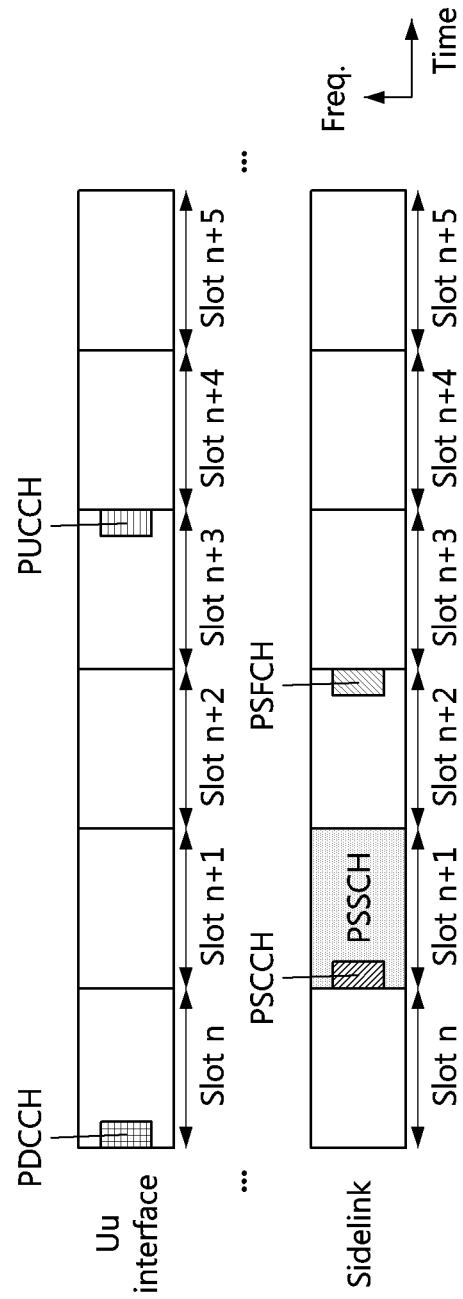
FIG. 4 is a conceptual diagram illustrating a first exemplary embodiment of a PSSCH HARQ-ACK feedback timing method.
Figure 5:
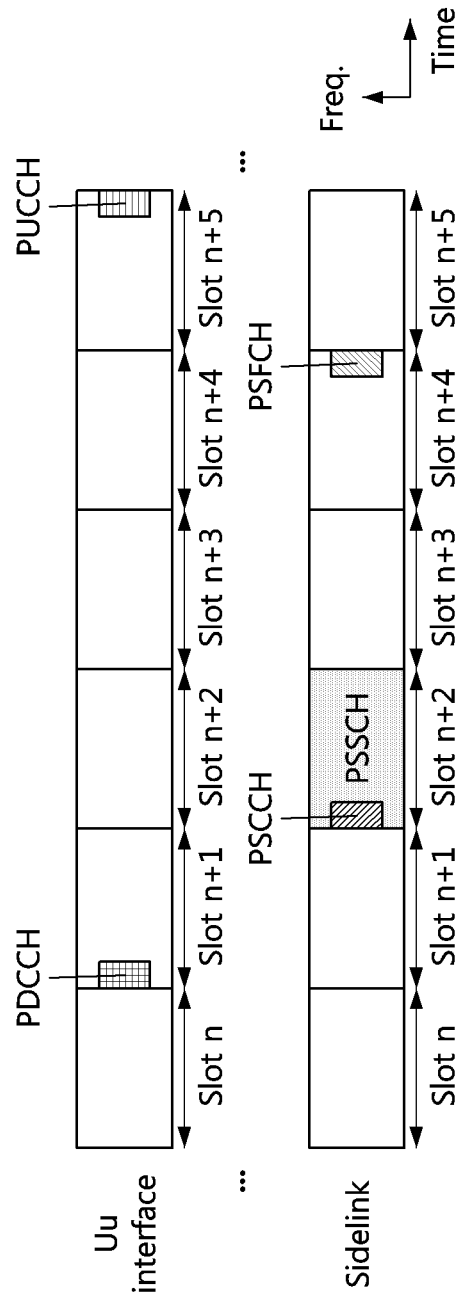
FIG. 5 is a conceptual diagram illustrating a second exemplary embodiment of a PSSCH HARQ-ACK feedback timing method.

FIG. 4 is a conceptual diagram illustrating a first exemplary embodiment of a PSSCH HARQ-ACK feedback timing method, and FIG. 5 is a conceptual diagram illustrating a second exemplary embodiment of a PSSCH HARQ-ACK feedback timing method.

In the exemplary embodiments illustrated in FIGS. 4 and 5, the terminal (i.e., source terminal and target terminal) may be assumed to have been configured by the base station with PSFCH resources having periodicity of 2 slots as in the exemplary embodiment of FIG. 3. In the exemplary embodiments illustrated in FIGS. 4 and 5, the first mode sidelink resource allocation scheme is used, and the use of sidelink resources may be controlled by the base station.

Referring to FIG. 4, the base station may transmit PSSCH resource allocation and scheduling information to the source terminal through a Uu downlink in a slot n. For example, the PSSCH resource allocation and scheduling information may be transmitted through a PDCCH, and a specific DCI format (e.g., DCI format 3_0, DCI format 3_1, etc.) and/or a CRC scrambled with a specific RNTI (e.g., sidelink RNTI, SL-RNTI, SL-CS-RNTI, SL-L-CS-RNTI, etc.) for sidelink resource allocation may be applied to transmission of the PDCCH. In addition, the base station may inform the terminal of information on a time offset (e.g., symbol offset, slot offset) between the resource through which the PDCCH (or, DCI, DCI format, etc.) is transmitted and the PSSCH resource through a signaling procedure (e.g., RRC signaling and/or DCI signaling). The information on the time offset may be included in the PSSCH resource allocation and scheduling information. According to the exemplary embodiment of FIG. 4, the time offset may be a slot offset between the slot (i.e., the slot n) in which the PDCCH or DCI, DCI format) is transmitted and the slot (i.e., a slot (n+1)) to which PSSCH is allocated, and a value of the slot offset may be 1. Alternatively, the time offset may be a time distance (e.g., symbol offset) between an ending time of receiving the PDCCH (or DCI, DCI format) (e.g., the last symbol or an ending time of the last symbol of the PDCCH) and a starting time of the allocated PSSCH resource (e.g., the first symbol or a starting time of the first symbol of the PSSCH). The time offset may be greater than or equal to a reference value. The reference value may correspond to the PDCCH reception processing time and the PSSCH (and PSCCH) transmission preparation time of the terminal, or a value determined at least in consideration of these, and may be predefined in the technical specification.

The source terminal may transmit an SCI including the PSSCH resource allocation and scheduling information and the corresponding PSSCH to the target terminal in the slot (n+1). A specific SCI format(s) (e.g., SCI format 1-A, SCI format 2-A, SCI format 2-B, etc.) may be used for transmitting the SCI. In addition, the SCI may be transmitted through a PSCCH, a part of a PSSCH resource, or the like. For example, when the SCI is configured in 2-stages, the first SCI may be transmitted through a PDCCH and the second SCI may be transmitted through a part of a PSSCH resource. Here, it is only one exemplary embodiment that the SCI and the PSSCH are transmitted in the same slot, and according to another exemplary embodiment, the SCI and the PSSCH may be transmitted in different slots. In addition, according to another exemplary embodiment, the SCI and PSSCH may be transmitted in the same slot (e.g., the slot n) as the slot of the PDCCH.

Referring to FIG. 4 again, after receiving the PSSCH, the target terminal may transmit an HARQ-ACK (i.e., sidelink HARQ-ACK) for the PSSCH to the source terminal through a sidelink (e.g., PSFCH). In this case, as described above, the target terminal may transmit the PSFCH from a time point after a predetermined time (e.g., L slots) from the time point when the PSSCH is received. According to the exemplary embodiment of FIG. 4, the target terminal may transmit the PSFCH from the next slot (i.e., a slot (n+2)) of the slot (i.e., the slot (n+1)) in which the PSSCH is received. Accordingly, the target terminal may transmit the PSFCH in a PSFCH resource at the earliest time point (i.e., a PSFCH resource allocated in the slot (n+2)) among the slot (n+2), which is the next slot of the slot in which the PSSCH is received, and subsequent slots (i.e., L=1).

The source terminal may receive the sidelink HARQ-ACK for the PSSCH from the target terminal, and transmit sidelink HARQ-ACK report information related thereto to the base station through a Uu uplink (e.g., PUCCH or PUSCH). In this case, a time offset (e.g., symbol offset, slot offset) between the resource through which PSFCH is transmitted and the resource (e.g., PUCCH resource or PUSCH resource) through which the sidelink HARQ-ACK report information is transmitted may be equal to or greater than a reference value. The reference value may correspond to the PSFCH reception processing time and the PUCCH (or PUSCH) transmission preparation time of the terminal, or may be a value determined at least in consideration of these, and may be predefined in the technical specification. According to the exemplary embodiment of FIG. 4, the source terminal may transmit the sidelink HARQ-ACK report information to the base station in the next slot (i.e., a slot (n+3)) of the slot (i.e., the slot (n+2)) in which the PSFCH is received.

Meanwhile, as described above, the source terminal may not receive the sidelink HARQ-ACK from the target terminal. This may correspond to a case when a quality of a sidelink radio channel between the terminals is poor and the source terminal does not detect the PSFCH or a case when the target terminal does not transmit the sidelink HARQ-ACK. In this case, the source terminal may transmit NACK to the base station as the sidelink HARQ-ACK report information in order to request PSSCH retransmission to the base station. The exemplary embodiments may be generally described based on the case when the source terminal successfully receives the sidelink HARQ-ACK from the target terminal, but may also be applied to the opposite cases. In addition, the 'reception success' may include a detection error, that is, a case when the target terminal transmits ACK (or NACK), but the source terminal receives NACK (or ACK) and a case when the target terminal does not transmit HARQ-ACK, but the source terminal receives ACK or NACK.

Referring to FIG. 5, the base station may transmit the PSSCH resource allocation and scheduling information to the source terminal through a Uu downlink (e.g., PDCCH) in the slot (n+1). The source terminal may transmit an SCI including the PSSCH resource allocation and scheduling information and the corresponding PSSCH to the target terminal in the slot (n+2). The SCI may be transmitted through a PSCCH, a part of a PSSCH resource, or the like. In consideration of the above-described transmission/reception processing time, the target terminal may transmit a PSFCH in a PSFCH resource allocated in the earliest PSFCH resource (i.e., a slot (n+4)) among the slot (n+3), which is the next slot of the slot in which the PSSCH is received, and subsequent slots (i.e., L=1). The source terminal may transmit sidelink HARQ-ACK report information for the received sidelink HARQ-ACK to the base station through a PUCCH (or PUSCH) in the next slot (i.e., a slot (n+5)) of the slot (i.e., the slot (n+4)) in which the PSFCH is received.

Referring again to the exemplary embodiment of FIG. 4, the base station may receive the sidelink HARQ-ACK report information transmitted by the source terminal in the slot (i.e., the slot (n+3)) two slots after the slot (i.e., the slot (n+1)) in which the PSSCH is transmitted. Alternatively, the base station may receive the sidelink HARQ-ACK report information transmitted by the source terminal in the slot (i.e., the slot (n+3)) three slots after the slot (i.e., the slot n))

in which the PDCCH is transmitted. On the other hand, in the exemplary embodiment of FIG. 5, the base station may receive the sidelink HARQ-ACK report information transmitted by the source terminal in the slot (i.e., the slot (n+5)) three slots after the slot (i.e., the slot (n+2)) in which the PSSCH is transmitted. Alternatively, the base station may receive the sidelink HARQ-ACK report information transmitted by the source terminal in the slot (i.e., the slot (n+5)) four slots after the slot (i.e., the slot (n+1)) in which the PDCCH is transmitted. According to the comparison of the above exemplary embodiments, when a slot-based periodicity N of the PSFCH resources configured to the terminal is greater than 1, a distance (i.e., slot offset) between the slot in which the PSSCH (or PDCCH) is transmitted and the slot in which the PSFCH is transmitted may vary according to the position of the slot in which PSSCH (or PDCCH) is transmitted. In addition, when the slot-based periodicity N of the PSFCH resources configured to the terminal is greater than 1, a distance (i.e., slot offset) or a minimum distance (i.e., minimum slot offset) between the slot in which the PSSCH (or PDCCH) is transmitted and the slot in which the sidelink HARQ-ACK report information is transmitted may vary according to the position of the slot in which the PSSCH (or PDCCH) is transmitted.

On the other hand, the base station may configure a timing or a transmission time (hereinafter, 'sidelink HARQ-ACK report timing') of transmitting sidelink HARQ-ACK report information to the source terminal through a Uu uplink (e.g., PUCCH or PUSCH). As a method for this, the sidelink HARQ-ACK report timing may be defined as a relative distance (i.e., time offset (hereinafter referred to as 'K')) from the PSSCH transmission time point, and the base station may explicitly or implicitly configure or indicate a value of K to the source terminal. This may be referred to as 'Method 100'.

K may be configured in units of slot(s). That is, K may be defined as an offset in units of slot(s) (i.e., a distance between the slot at the time when the PSSCH is transmitted and the slot at the time when the sidelink HARQ-ACK report information is transmitted). In the exemplary embodiment of FIG. 4 and the exemplary embodiment of FIG. 5, the base station may dynamically indicate the slot offsets K=2 and K=3 to the source terminal by Method 100, respectively. Alternatively, K may be configured in units of symbol(s). That is, K may be defined as an offset in units of symbol(s) (i.e., a distance between one of the symbol(s) at the time when the PSSCH is transmitted and one of the symbol(s) at the time when the sidelink HARQ-ACK report information is transmitted). The source terminal may transmit the sidelink HARQ-ACK report information to the base station according to the sidelink HARQ-ACK report timing determined by the PSSCH reception time and the value of K. However, according to Method 100, since a plurality of sidelink HARQ-ACK report timings or a plurality of K values should be configured to the source terminal when the slot-based periodicity N of the PSFCH resources configured to the terminal is greater than 1, the base station may need to dynamically change the value of K according to the position of the slot to which the PSSCH is allocated. This may increase scheduling complexity and DCI overhead.

As a method for solving the above problem, the base station may configure or indicate the sidelink HARQ-ACK report timing to the source terminal as a relative distance from the PSSCH transmission time point, that is, the time offset (=K), and the source terminal may derive a corrected sidelink HARQ-ACK report timing by adding an additional offset (hereinafter referred to as "$K_{offset}$") to the value of K, which is received from the base station, and transmit the sidelink HARQ-ACK report information to the base station according to the corrected timing. This may be referred to as 'Method 110'. As in Method 100, K may be configured in units of slot(s) or symbol(s), and $K_{offset}$ may also be configured in units of slot(s) or symbol(s). The configuration unit of $K_{offset}$ may be the same as the configuration unit of K.

In Method 110, the sidelink HARQ-ACK report timing (i.e., K) that the base station signals to the source terminal may be a nominal value. That is, when $K_{offset}$ is not 0, the timing at which the source terminal actually transmits the sidelink HARQ-ACK report information to the base station may not match the sidelink HARQ-ACK report timing signaled by the base station to the source terminal. In Method 110, $K_{offset}$ may be determined by a distance (e.g., a time distance expressed in slot(s) or symbol(s)) between the PSSCH transmission time and the PSFCH reception time of the source terminal. In addition, K may be a value obtained by regarding the distance between the PSSCH transmission time point and the PSFCH reception time point as a specific value. For example, K may be a value obtained by assuming the shortest distance or the longest distance among possible distances between the PSSCH transmission time point and the PSFCH reception time point.

In the exemplary embodiment of FIG. 4 and the exemplary embodiment of FIG. 5, the base station may configure or indicate the slot offset K=2 in common to the source terminal by Method 110. The value of K may not necessarily match the actual distance between the PSSCH transmission time and the sidelink HARQ-ACK report timing. For example, the value of K may be a value for a case of assuming that the shortest distance (i.e., one slot) among the possible distances between the PSSCH transmission time and the PSFCH reception time. In the case of the exemplary embodiment of FIG. 4, since the actual distance between the PSSCH transmission time and the PSFCH reception time is equal to the distance assumed as one slot, the source terminal may transmit the sidelink HARQ-ACK report information to the base station in the slot (n+3) by applying $K_{offset}$=0 and applying the sidelink HARQ-ACK report timing (i.e., K) received from the base station as it is. On the other hand, in the exemplary embodiment of FIG. 5, since the actual distance between the PSSCH transmission time and the PSFCH reception time is 2 slots, which is one slot larger than the assumed distance, the source terminal may correct the sidelink HARQ-ACK report timing signaled from the base station by adding $K_{offset}$=1 thereto, and transmit the sidelink HARQ-ACK report information to the base station in the slot (n+5) according to the corrected sidelink HARQ-ACK report timing.

As another method for solving the above problem, the sidelink HARQ-ACK report timing may be defined as a relative distance from the PSFCH transmission time, that is, a time offset (hereinafter referred to as 'L'), and the base station may explicitly or implicitly configure or indicate a value of L to the source terminal. This may be referred to as 'Method 120'. Similarly, L may be configured in units of symbol(s) or slot(s). For example, L may be defined as an offset in units of slot(s) (i.e., a distance between a slot at the time when the PSFCH is transmitted and a slot at the time when the sidelink HARQ-ACK report information is transmitted). For another example, L may be defined as an offset in units of symbol(s) (i.e., a distance between one of symbol(s) at the time when the PSFCH is transmitted and one of symbol(s) at the time when the sidelink HARQ-ACK report information is transmitted). The symbol(s) or slot(s)

may be symbol(s) or slot(s) belonging to a sidelink resource pool (e.g., a sidelink resource pool for PSSCH and/or PSFCH transmission). For example, L may indicate the number of slot(s) belonging to the sidelink resource pool. In this case, an actual physical offset between the slot at the time when the PSFCH is transmitted and the slot at the time when the sidelink HARQ-ACK report information is transmitted may be greater than or equal to L. For another example, L may indicate the number of symbol(s) belonging to the sidelink resource pool. In this case, an actual physical offset between one of the symbol(s) at the time when the PSFCH is transmitted and one of the symbol(s) at the time when the sidelink HARQ-ACK report information is transmitted may be greater than or equal to L. In Method 120, the base station and the source terminal may know the transmission time of the PSFCH corresponding to each PSSCH transmission, and thus the transmission time of the PSFCH may be used as a reference time for the sidelink HARQ-ACK report timing.

In the exemplary embodiment of FIG. 4 and the exemplary embodiment of FIG. 5, the base station may indicate the slot offset of 1 (i.e., L=1) to the source terminal by Method 120. That is, the base station may configure or indicate a distance between a slot at the time when the source terminal expects to receive the PSFCH from the target terminal and a slot at the time when the source terminal is to transmit the HARQ-ACK report information to the base station to be 1. The source terminal may transmit the sidelink HARQ-ACK report information to the base station according to the sidelink HARQ-ACK report timing determined by the value of L received from the base station. Referring to FIG. 4, the source terminal may transmit the sidelink HARQ-ACK report information corresponding to the PSFCH to the base station through a Uu link (e.g., PUCCH or PUSCH) in a slot (i.e., the slot (n+3)) after L (=1) slot(s) from the slot (i.e., the slot (n+2)) in which the PSFCH is received. Also, referring to FIG. 5, the source terminal may transmit the sidelink HARQ-ACK report information corresponding to the PSFCH to the base station through a Uu link (e.g., PUCCH or PUSCH) in a slot (i.e., the slot (n+5)) after L (=1) slot(s) from the slot (i.e., the slot (n+4)) in which the PSFCH is received.

As described above, according to Method 110 or Method 120 in the above exemplary embodiments, even when N>1, one value may be used as the sidelink HARQ-ACK report timing of the source terminal, and in this case, it may be sufficient that the sidelink HARQ-ACK report timing is configured semi-statically by an RRC signaling. Accordingly, scheduling complexity and DCI overhead may be reduced compared to Method 100. In addition, since Method 120 does not include the step of correcting the timing by the terminal, it may provide a low implementation complexity compared to Method 110.

As another method of indicating the terminal of the sidelink HARQ-ACK report timing, the sidelink HARQ-ACK report timing may be defined as a relative distance from the PDCCH transmission time of the Uu downlink. Alternatively, the sidelink HARQ-ACK report timing may be defined as a relative distance from the SCI transmission time (e.g., PSCCH transmission time). The base station may determine a value of the sidelink HARQ-ACK report timing according to the above definition, and configure or indicate it to the source terminal. Similarly, the value of the timing may be configured in units of slot(s) or symbol(s).

In the exemplary embodiments, a numerology used for transmission of the PSFCH (hereinafter referred to as a 'first numerology') may be the same as a numerology used for transmission of the PUCCH (or PUSCH) (hereinafter referred to as a 'second numerology'). For example, the first numerology may be a numerology of the (active) sidelink bandwidth part. For example, the second numerology may be the numerology of the uplink bandwidth part, one numerology determined among the numerologies of the uplink and downlink bandwidth parts, or the like.

Alternatively, in the exemplary embodiments, the first numerology may be usually different from (i.e., may be the same as or different from) the second numerology. In this case, the sidelink HARQ-ACK report timing of the terminal, the time offset indicating the sidelink HARQ-ACK report timing, a reference time for determining the time offset, etc. may be interpreted based on the numerology (i.e., the second numerology) used for transmission of the sidelink HARQ-ACK report information. For example, in the case of Method 120, the slot at the time when the PSFCH is transmitted, the slot at the time when the PUCCH (or PUSCH) is transmitted, and the time offset (e.g., slot offset) may be slots in the uplink bandwidth part through which the PUCCH (or PUSCH) is transmitted. The value of L may mean the number of slots in the uplink bandwidth part through which the PUCCH (or PUSCH) is transmitted. In addition, the slot, in which the PUCCH (or PUSCH) is transmitted, corresponding to L=0 may be one (e.g., the last slot) of the uplink slot(s) temporally overlapping with the PSFCH transmission time (or the sidelink slot including the PSFCH).

Alternatively, the sidelink HARQ-ACK report timing of the terminal, the time offset indicating the sidelink HARQ-ACK report timing, the reference time for determining the time offset, etc. may be interpreted based on the first numerology. Alternatively, the sidelink HARQ-ACK report timing of the terminal, the time offset indicating the sidelink HARQ-ACK report timing, the reference time for determining the time offset, etc. may be interpreted based on a specific numerology. For example, the specific numerology may be one of the first and second numerologies (e.g., a numerology with a subcarrier spacing greater or smaller). For another example, the specific numerology may be a numerology (e.g., reference numerology) separately configured to the terminal.

In the exemplary embodiments, the slot offset or the number of slots indicated (or configured) from the base station to the source terminal may be the number of physical slot(s) (e.g., temporally consecutive slot(s)). Alternatively, the slot offset or the number of slots indicated (or configured) from the base station to the source terminal may be the number of logical slot(s) (e.g., sequential slot(s) satisfying a specific condition). For example, the logical slot(s) may mean slot(s) belonging to the sidelink resource pool. Adjacent logical slots may not be consecutive in time. That is, slots that do not belong to the sidelink resource pool may exist between the adjacent logical slots.

In the exemplary embodiments, the base station may indicate or configure a PUCCH resource for transmitting the sidelink HARQ-ACK report information to the source terminal. In addition, the base station may indicate or configure the source terminal not to transmit the sidelink HARQ-ACK report information. The information indicating that the sidelink HARQ-ACK report information is not to be transmitted may be included in sidelink HARQ-ACK report timing indication information and/or PUCCH resource indication information. This may correspond to a specific field value of specific field(s) of the DCI.

In the exemplary embodiments, each sidelink HARQ-ACK report performed by the source terminal may correspond to one or a plurality of PSFCH(s) received by the source terminal from the target terminal. For example, the base station may allocate a plurality of PSSCH resources for the same TB (or TB set) to the source terminal. The source terminal may transmit a plurality of PSSCHs to the target terminal and receive a plurality of PSFCHs corresponding thereto. The source terminal may determine ACK or NACK for the TB (or TB set) based on reception of the plurality of PSFCHs, and transmit corresponding sidelink HARQ-ACK report information to the base station through a PUCCH (or PUSCH). In this case, the sidelink HARQ-ACK report timing (e.g., PUCCH or PUSCH transmission slot) by Method 120 may be determined based on a reception time of one PSFCH (i.e., a PSFCH that the source terminal receives or expects to receive last or at the latest) among at least one PSFCH(s) that the source terminal receives or expects to receive for the same TB (or, TB set).

The PSFCH resource may be configured to the terminal through RRC signaling. In this case, the configuration of the PSFCH resource may be basically terminal-specific. However, in order to effectively support PSFCH transmission between terminals and a sensing operation on the PSFCH, the PSFCH resource may need to be commonly configured for a plurality of terminals. For this, cell-specific signaling may be used for the configuration of the PSFCH resource. For example, the configuration of the PSFCH may be common within one serving cell or base station, which may be configured to the terminal through MIB, SIB1, OSI, and/or the like. Meanwhile, the source terminal and the target terminal may belong to different serving cells or base stations, or the PSFCH may be configured from different serving cells or base stations. When the configurations of the PSFCH are different, the PSFCH transmission and sensing between the source terminal and the target terminal may be difficult. Accordingly, the configuration of the PSFCH may be commonly applied to a wider unit. For example, the configuration of the PSFCH may be common within a group consisting of at least one serving cell or base station. A serving cell group ID or a base station group ID may be used or an area (e.g., zone) ID may be used to configure the PSFCH for each group. For example, a pair of terminals performing sidelink transmission and reception may perform transmission only when they have the same zone ID. Whether zone IDs of terminals belonging to a pair are the same may be identified through a signaling procedure (e.g., RRC signaling) between the terminals. The signaling may be performed in form of a two-way or a handshake.

In the above exemplary embodiments, the PSSCH may be a PSSCH scheduled by a dynamic grant. In the first mode sidelink resource allocation, the dynamic grant for the PSSCH may mean a downlink assignment (or downlink grant) that the base station transmits to the source terminal. The downlink assignment for the PSSCH may be a DCI (e.g., DCI format 3_0) and may be transmitted through a PDCCH. A CRC scrambled with a specific RNTI (e.g., SL-RNTI) may be applied to the downlink assignment for the PSSCH. Alternatively, the dynamic grant for the PSSCH may mean a sidelink grant transmitted from the source terminal to the target terminal. The sidelink grant for the PSSCH may be a SCI (e.g., SCI format 1-A, 2-A, 2-B, etc.) and may be transmitted through a PSCCH, a part of a PSSCH resource, or the like.

In addition, in the above exemplary embodiments, the PSSCH may be a PSSCH scheduled by a configured grant. Hereinafter, the configured grant-based PSSCH will be referred to as a configured grant (CG) PSSCH for convenience. The sidelink configured grant scheme may be classified into a type 1 scheme and a type 2 scheme. In case of the type 1 scheme, resource configuration and scheduling of the configured grant PSSCH may be configured semi-statically or semi-persistently through RRC signaling. In case of the type 2 scheme, resource configuration and scheduling of the configured grant PSSCH may be configured through a combination of RRC signaling and physical layer signaling (e.g., DCI or SCI). Also, in the type 2 scheme, a configured grant PSSCH resource may be activated (or initialized), reactivated (or reinitialized), or deactivated by physical layer signaling (e.g., DCI or SCI). In particular, in case of transmission of the configured grant PSSCH, since the base station may not be able to dynamically indicate the sidelink HARQ-ACK report timing, the effect of Method 110 or Method 120 may be large. Alternatively, the base station may configure the configured grant PSSCH resource such that a time distance (e.g., distance in units of slot(s) or symbol(s)) between the configured grant PSSCH resource and the PSFCH resource is a predetermined constant value. In this case, Method 100 may be applied well.

The configuration of the sidelink configured grant resource may be configured by the base station to the source terminal. In addition, the configuration of the sidelink configured grant resource may be configured by the source terminal to the target terminal. Alternatively, the configuration of the sidelink configured grant resource may be configured by the base station to the target terminal. The source terminal and the target terminal may be configured with the sidelink configured grant resource by the same base station or different base stations.

The sidelink configured grant resource may appear periodically. The periodicity of the sidelink configured grant resource may be configured to the terminal (e.g., source terminal, target terminal), and one or a plurality of sidelink configured grant resources may be arranged within one period. One PSSCH and/or one PSCCH may be transmitted in each sidelink configured grant resource. In this case, the source terminal may always transmit the PSSCH and/or PSCCH in all the sidelink configured grant resources.

On the other hand, in some cases (e.g., when a sidelink traffic (e.g., sidelink-shared channel (SL-SCH)) occurs aperiodically), the source terminal may or may not transmit the PSSCH and/or PSCCH in each of the sidelink configured grant resources. In this case, the target terminal may transmit an HARQ-ACK for the PSSCH and/or PSCCH to the source terminal only when the PSSCH is received in the sidelink configured grant resource or when the corresponding PSCCH is successfully decoded. Alternatively, the target terminal may always transmit the HARQ-ACK for the PSSCH and/or PSCCH to the source terminal regardless of whether or not the PSSCH and/or PSCCH is received in the sidelink configured grant resource. In this case, when the target terminal successfully receives the PSSCH, ACK may be transmitted, and in the other case, NACK may be transmitted. Alternatively, in the first mode sidelink resource allocation, whether to transmit the HARQ-ACK of the target terminal for the PSSCH (e.g., dynamic grant PSSCH, configured grant PSSCH) may be signaled from the source terminal to the target terminal (e.g., through SCI Signaling or PC5-RRC signaling).

Similarly, the source terminal may report the HARQ-ACK to the base station only when the PSSCH is transmitted in the sidelink configured grant resource(s). Alternatively, the source terminal may always report the HARQ-ACK to the base station regardless of whether the PSSCH is actually transmitted in the sidelink configured grant resource(s). The latter method may improve the reception performance and transmission delay time of the PSSCH by consuming more Uu interface resources. In this case, the source terminal may report ACK to the base station as sidelink HARQ-ACK report information for a corresponding TB, when the PSSCH is not transmitted in a sidelink configured grant resource(s). The base station may not allocate a retransmission resource for the corresponding PSSCH (or corresponding TB) based on reception of the sidelink HARQ-ACK report information. Alternatively, the source terminal may report NACK to the base station as the sidelink HARQ-ACK report information for a corresponding TB, when the PSSCH is not transmitted in a sidelink configured grant resource(s). Alternatively, in the above case, the source terminal may transmit to the base station information (e.g., third information other than ACK/NACK) indicating that the PSSCH has not been transmitted through an HARQ-ACK transmission resource (e.g., PUCCH or PUSCH). The information indicating that the PSSCH has not been transmitted may be included in the sidelink HARQ-ACK report information. The above operation of the terminal may be predefined in the technical specification, or may be configured or configured through signaling from the base station or another terminal.

The above-described method may be equally applied to the dynamic grant based PSSCH as well as the configured grant PSSCH. In addition, the above-described method may be applied to the previously described methods (e.g., Method 100, Method 110, Method 120, etc.) and their exemplary embodiments. For example, in the exemplary embodiment of FIG. 4, the source terminal may transmit the sidelink HARQ-ACK report information corresponding to the PSSCH to the base station in the slot (n+3), regardless of whether the PSSCH has been actually transmitted in the slot (n+1) and/or whether the PSFCH has been actually received in the slot (n+2). The PSSCH allocated to the slot (n+1) may be a dynamic grant PSSCH or a configured grant PSSCH. In addition, in the exemplary embodiment of FIG. 5, the source terminal may transmit the sidelink HARQ-ACK report information corresponding to the PSSCH to the base station in the slot (n+5), regardless of whether the PSSCH has been actually transmitted in the slot (n+2) and/or whether the PSFCH has been actually received in the slot (n+4). The PSSCH allocated to the slot (n+2) may be a dynamic grant PSSCH or a configured grant PSSCH.

PSSCH Retransmission Method

Hereinafter, PSSCH retransmission methods in case of the first mode of sidelink resource allocation will be described.

Figure 6:
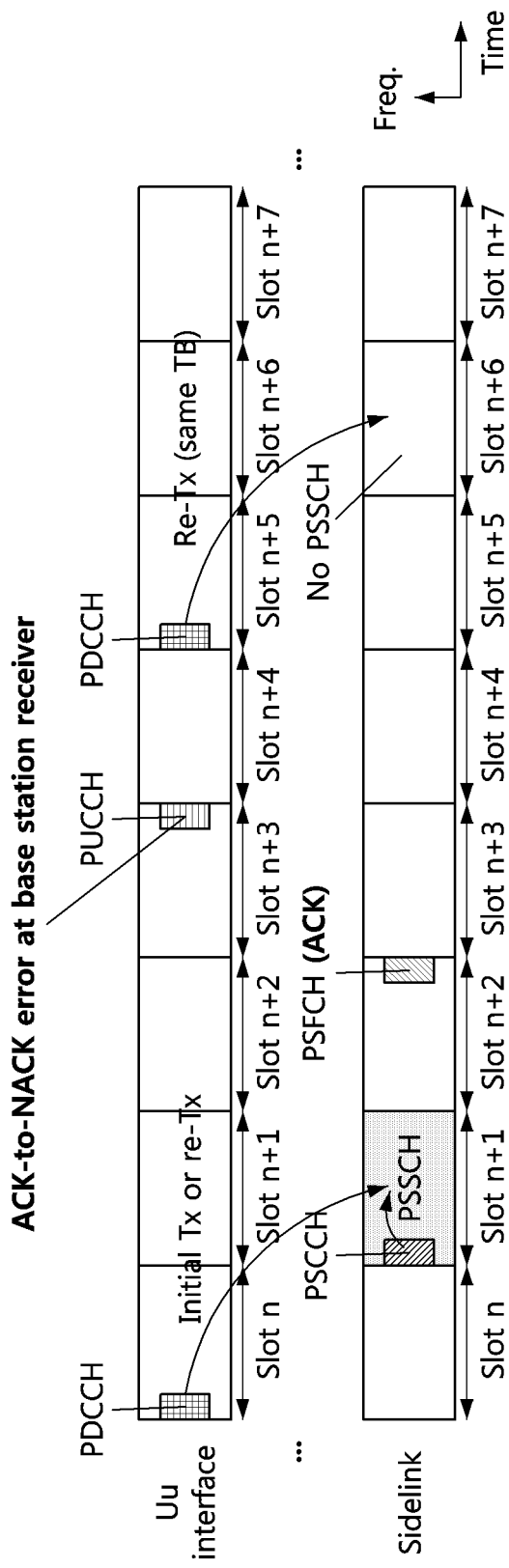
FIG. 6 is a conceptual diagram illustrating a first exemplary embodiment of a PSSCH retransmission method.
Figure 7:
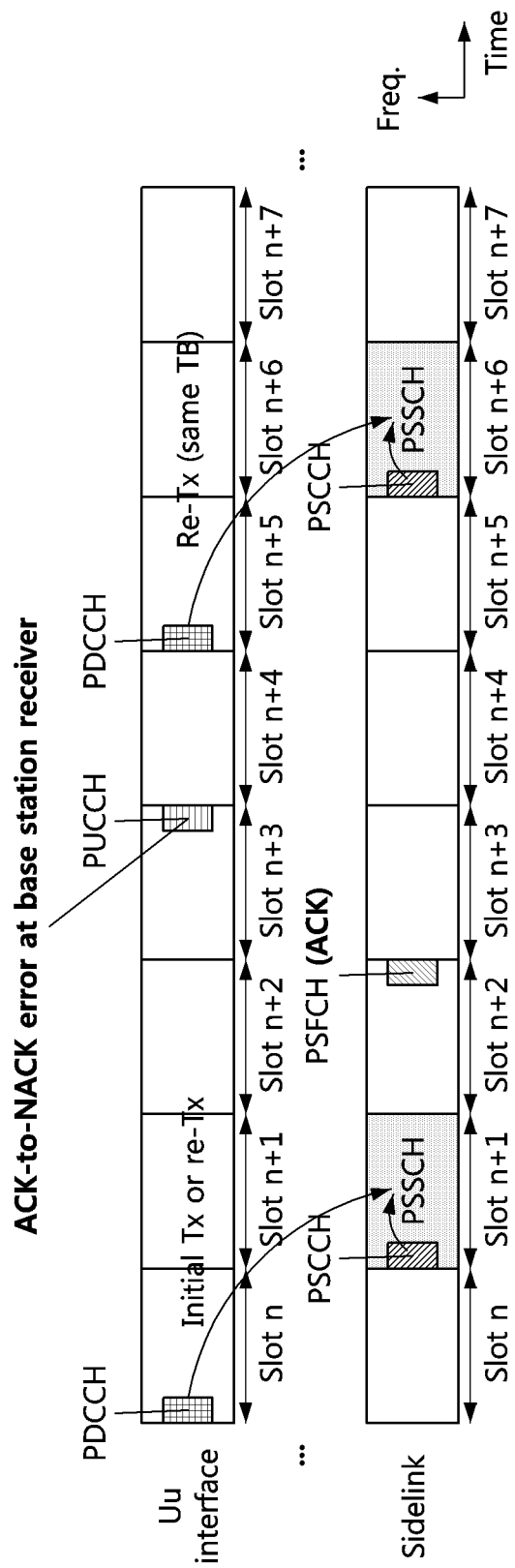
FIG. 7 is a conceptual diagram illustrating a second exemplary embodiment of a PSSCH retransmission method.

FIG. 6 is a conceptual diagram illustrating a first exemplary embodiment of a PSSCH retransmission method, and FIG. 7 is a conceptual diagram illustrating a second exemplary embodiment of a PSSCH retransmission method.

Referring to FIGS. 6 and 7, the first mode sidelink resource allocation may be used and sidelink resource usage may be controlled by the base station. The base station may transmit PSSCH resource allocation and scheduling information to the source terminal through a Uu downlink (e.g., PDCCH) in a slot n. The source terminal may transmit a SCI including the PSSCH resource allocation and scheduling information received from the base station and a corresponding PSSCH to the target terminal in a slot (n+1). For example, the SCI may be transmitted through a PSCCH, a part of a PSSCH resource, or the like. The target terminal may successfully receive the PSSCH and transmit ACK as sidelink HARQ-ACK information to the source terminal through a sidelink (e.g., PSFCH) in a slot (n+2). After receiving the ACK from the target terminal, the source terminal may transmit ACK as sidelink HARQ-ACK report information to the base station through a PUCCH (or PUSCH) in a slot (n+3).

In this case, the base station may receive NACK as the sidelink HARQ-ACK report information through reception of the PUCCH (or PUSCH). That is, although the source terminal has transmitted ACK as the sidelink HARQ-ACK report information, the base station may receive NACK due to a detection error (i.e., ACK-to-NACK error) of a receiving end. The base station may schedule a retransmission PSSCH for the same TB or the same HARQ process in a slot (n+6) based on the NACK, and transmit resource allocation and scheduling information of the retransmission PSSCH to the source terminal through a Uu downlink (e.g., PDCCH) in a slot (n+5).

The source terminal may successfully receive the resource allocation and scheduling information of the retransmission PSSCH from the base station. In this case, although the source terminal has received ACK for the PSSCH (or TB corresponding thereto) from the target terminal, and has transmitted to the base station ACK as the sidelink HARQ-ACK report information corresponding thereto, the source terminal may be instructed by the base station to retransmit the corresponding PSSCH (or the TB corresponding thereto). The following method may be considered as the operation of the source terminal in this case.

As the first method, the source terminal may ignore the retransmission instruction of the base station and may not transmit the retransmission PSSCH to the target terminal. That is, the source terminal may no longer transmit the PSSCH for the TB. This may be referred to as 'Method 200'. Referring to FIG. 6, according to Method 200, the source terminal may ignore the retransmission instruction (e.g., downlink DCI) received from the base station through the PDCCH in the slot (n+5), and may not transmit the PSSCH in a slot (n+6).

As the second method, the source terminal may transmit the retransmission PSSCH to the target terminal according to the retransmission instruction of the base station. This may be referred to as 'Method 210'. Referring to FIG. 7, according to Method 210, the source terminal may transmit the retransmission PSSCH for the same TB to the target terminal in the slot (n+6) based on the retransmission instruction (e.g., downlink DCI) received from the base station through the PDCCH in the slot (n+5). In this case, the source terminal may transmit to the target terminal a SCI including the resource allocation and scheduling information of the retransmission PSSCH together with the retransmission PSSCH.

On the other hand, the base station may configure or indicate a reserved resource in sidelink resources (e.g., sidelink bandwidth part or sidelink resource pool) to the terminal for retransmission of the PSSCH or transmission of a PSSCH for another TB. That is, the source terminal may be allocated a reserved resource in the sidelink resources from the base station, and may transmit the PSSCH (and/or PSCCH, CSI-RS) to the target terminal through the reserved resource. The reserved resource may mean a PSSCH resource, a retransmission PSSCH resource, or the like. The reserved resource may mean PSSCH resource(s) including a first scheduled PSSCH resource. Alternatively, the reserved resource may mean PSSCH resource(s) after the first (or earliest) PSSCH resource among scheduled PSSCH resources. In the above exemplary embodiments, the retransmission PSSCH resource (i.e., the PSSCH resource allocated to the slot (n+6)) scheduled from the base station to the source terminal may be regarded as the reserved resource. This will be described through the following exemplary embodiments.

Figure 8:
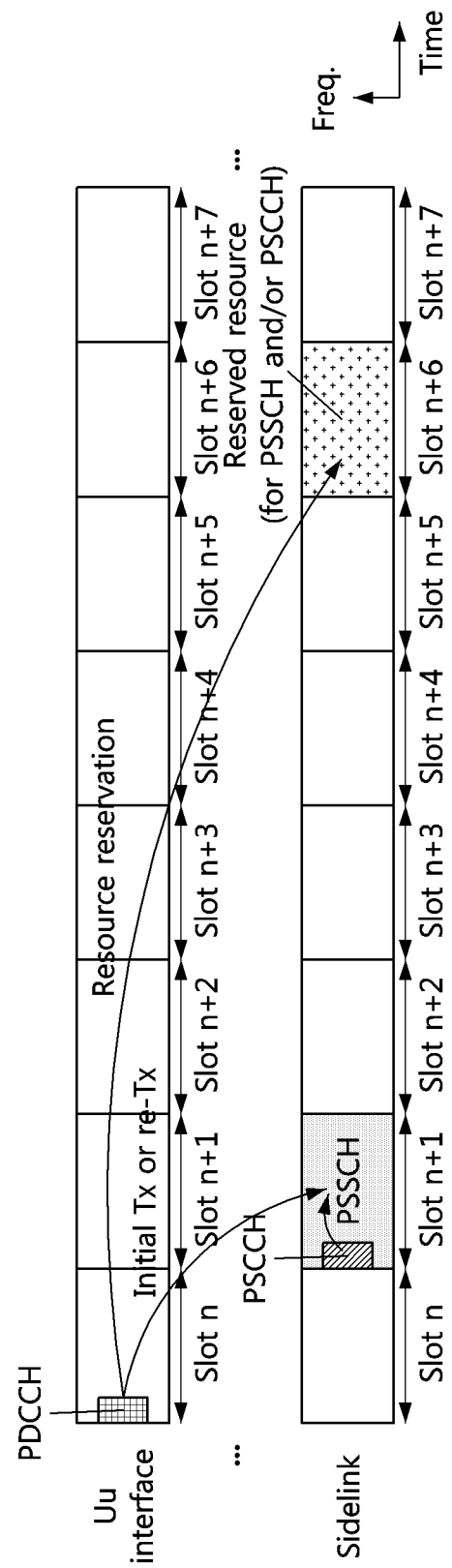
FIG. 8 is a conceptual diagram illustrating a first exemplary embodiment of sidelink reserved resource allocation by a base station.

FIG. 8 is a conceptual diagram illustrating a first exemplary embodiment of sidelink reserved resource allocation by a base station.

Referring to FIG. 8, as in the above exemplary embodiments, the base station may transmit PSSCH resource allocation and scheduling information to the source terminal through a Uu downlink (e.g., PDCCH) in a slot n. Further, the base station may transmit allocation information of a reserved resource for PSSCH transmission to the source terminal together with the PSSCH resource allocation and scheduling information (e.g., through the PDCCH). In FIG. 8, the reserved resource may be allocated to a slot (n+6).

In addition, the reserved resource allocated by the base station or the source terminal may be released. For example, if transmission of a signal (e.g., PSSCH, retransmission PSSCH, PSCCH, etc.) intended to be transmitted through the reserved resource becomes unnecessary, the reserved resource may be released. In the released reserved resource, another resource may be allocated or another signal may be transmitted. An entity determining the release of the reserved resource may be the base station or the source terminal.

The reserved resource may be allocated for PSSCH retransmission and signaled to the target terminal. That is, the source terminal may perform signaling (e.g., SCI signaling) of resource allocation and scheduling information on the reserved resource(s) allocated from the base station to the target terminal. The source terminal may inform the target terminal of information indicating that the reserved resource(s) is the resource for PSSCH retransmission. In this case, when the target terminal successfully receives a previous PSSCH for the same TB, the target terminal may not receive the retransmission PSSCH (and SCI including scheduling information of the retransmission PSSCH) through the reserved resource. In addition, the target terminal may transmit ACK to the source terminal for the previous PSSCH that has been successfully received. The ACK may be transmitted through a PSFCH. In this case, the target terminal may assume that the reserved resource has been released. For example, the target terminal may assume that the allocated reserved resource(s) is released after the time point at which the ACK is transmitted. Alternatively, if there is no separate signaling from the source terminal, the target terminal may not assume that the reserved resource is released despite successfully receiving the previous PSSCH and feeding back the ACK. That is, when the target terminal receives a separate signaling from the source terminal after transmitting the ACK to the source terminal, the target terminal may assume that the reserved resource is released. The assumption on the release of the reserved resource may affect the sensing procedure when the target terminal is a terminal that performs sensing for the second mode resource allocation. That is, when the target terminal assumes that the reserved resource is released, the target terminal may regard the reserved resource as belonging to a set of resources available for transmission.

Another terminal (hereinafter referred to as 'adjacent terminal') may exist around the target terminal or the source terminal. For example, the adjacent terminal may be a terminal configured to perform the second mode sidelink resource allocation, or a terminal configured to perform a sensing procedure for resource allocation. In this case, the adjacent terminal may receive a signal including information on ACK that the target terminal transmits to the source terminal and obtain the ACK information through the sensing procedure. For example, the adjacent terminal may obtain the ACK by monitoring a resource (e.g., PSFCH resource) through which the ACK information is transmitted and detecting a signal corresponding to the ACK or an energy corresponding to the ACK in the PSFCH resource. The adjacent terminal may predict that the reserved resource (e.g., the reserved resource allocated for PSSCH retransmission) is to be released based on the ACK information, and accordingly, the adjacent terminal may regard the reserved resource as belonging to a set of resources available for transmission. The step of including the reserved resource in the set of resources available for transmission may be performed within the sensing procedure for the second mode performed by the adjacent terminal.

According to Method 200, the source terminal may not transmit the retransmission PSSCH in the reserved resource. Referring again to FIGS. 6 and 7, the base station may allocate a sidelink reserved resource in the slot (n+6) as shown in FIG. 8. In addition, an adjacent terminal (e.g., a terminal performing the second mode sidelink resource allocation) around the target terminal may receive a signal including information on ACK transmitted by the target terminal in the slot (n+2), and assume that the reserved resource of the slot (n+6) is released. In addition, the adjacent terminal may occupy the released reserved resource and transmit a signal (e.g., PSSCH) as a source terminal. In this case, if the source terminal follows the retransmission instruction of the base station according to Method 210 and transmits the PSSCH in slot (n+6) as in the exemplary embodiment of FIG. 7, the PSSCH may collide with the signal transmitted by the adjacent terminal, and they may interfere with each other. On the other hand, if the source terminal ignores the retransmission instruction of the base station according to Method 200, and does not transmit the PSSCH in the slot (n+6) as in the exemplary embodiment of FIG. 6, the collision may not occur.

When Method 200 is used, the entity releasing the reserved resource (from a transmission point of view) may be the source terminal. In the first mode resource allocation, the allocation of the reserved resource may be performed by the base station, and in this case, the entity allocating the reserved resource and the entity releasing the reserved resource may be different. In this case, the source terminal may intervene partially or conditionally in determining whether to retransmit the PSSCH. For example, when the source terminal receives ACK for the previous PSSCH from the target terminal, whether to retransmit the PSSCH may be determined by the source terminal. Here, the expression that the source terminal receives ACK for the PSSCH may include a case when the source terminal determines ACK (e.g., when NACK is not received in the PSFCH resource for group NACK transmission). On the other hand, when the source terminal receives (or determines) NACK for the previous PSSCH from the target terminal, whether to retransmit the PSSCH may be determined by the base station. Alternatively, a method in which the source terminal always determines whether to retransmit the PSSCH may be used. Whether to use the above method may be configured by the base station to the source terminal, or preconfigured to the source terminal. On the other hand, when Method 210 is used, the entity releasing the reserved resource may be the base station. In this case, in the first mode resource allocation, the entity allocating the reserved resource and the entity releasing the reserved resource may coincide.

On the other hand, as described above, from a reception point of view, when the target terminal transmits ACK related to the reserved resource or an adjacent terminal receives ACK related to the reserved resource, which is transmitted by another terminal (e.g., target terminal), the target terminal or the adjacent terminal may autonomously assume that the reserved resource is released. Alternatively, the target terminal or the adjacent terminal may assume that the reserved resource is released through signaling from the base station or the source terminal.

When Method 210 is used, the source terminal may transmit sidelink HARQ-ACK report information for the retransmission PSSCH to the base station. The source terminal may receive a sidelink HARQ-ACK for the retransmission PSSCH, which is transmitted by the source terminal, from the target terminal and generate the sidelink HARQ-ACK report information to be reported to the base station based on the sidelink HARQ-ACK. A specific method for this may follow the above exemplary embodiment. For example, when receiving ACK (or NACK) from the target terminal, the source terminal may transmit ACK (or NACK) to the base station as the sidelink HARQ-ACK report information. In addition, the source terminal may transmit NACK as the sidelink HARQ-ACK report information to the base station when the sidelink HARQ-ACK information is not received from the target terminal. When the sidelink HARQ-ACK report corresponds to a plurality of PSSCHs (or a plurality of PSFCHs) for the same TB, the source terminal may transmit ACK to the base station as the sidelink HARQ-ACK report information when at least one of HARQ-ACK information received from the target terminal indicates ACK. The sidelink HARQ-ACK report information transmitted to the base station may be transmitted as multiplexed or encoded together with other information.

Meanwhile, according to Method 200, the source terminal may not transmit the retransmission PSSCH without following the retransmission instruction of the base station. Nevertheless, the source terminal may transmit sidelink HARQ-ACK report information for the retransmission PSSCH to the base station (when the sidelink HARQ-ACK report is requested by the base station). For example, in this case, the source terminal may report ACK to the base station as the sidelink HARQ-ACK report information for the retransmission PSSCH. The sidelink HARQ-ACK report information may be transmitted through a Uu uplink (e.g., PUCCH, PUSCH), and specifically, it may be transmitted through an uplink resource allocated by the base station. For example, the sidelink HARQ-ACK report information may be transmitted through a PUCCH allocated by the base station or derived by a predetermined rule, at a time point allocated by the base station. Alternatively, the sidelink HARQ-ACK report information may be transmitted as piggybacked in a PUSCH at the corresponding time point. Alternatively, the source terminal may not transmit the sidelink HARQ-ACK report information for the retransmission PSSCH to the base station.

Meanwhile, the above-described methods and exemplary embodiments may be applied in the same manner also to the case of transmission of the configured grant PSSCH. That is, in the exemplary embodiments of FIGS. 6, 7, and 8, the PDCCH of the slot n may include a DCI that initializes (or activates, reinitializes) a configured grant PSSCH resource. Alternatively, the PDCCH transmission procedure of the slot n may be omitted. In other words, the PSSCH transmitted in the slot (n+1) may be a PSSCH by a sidelink configured grant, and may be transmitted through a resource allocated in advance by RRC configuration and/or a DCI. In this case, a PSCCH or SCI including scheduling information of the PSSCH may be transmitted together with the PSSCH (e.g., in the same slot), may not be transmitted, or may be transmitted at a different time. In addition, the above exemplary embodiments may be applied to both the type 1 and type 2 sidelink configured grant schemes.

Also, in the case of the configured grant PSSCH, a reserved resource may be allocated in the same manner as described above. That is, the source terminal may regard the configured grant PSSCH resource as a reserved resource, and may transmit a PSSCH through the reserved resource. In case of the first mode resource allocation, resource allocation and scheduling information of the reserved resource may be configured or indicated from the base station to the source terminal. This may be performed by RRC signaling, MAC signaling (e.g., MAC CE), physical layer signaling (e.g., DCI), or the like. In addition, the source terminal may configure or indicate resource allocation and scheduling information of the reserved resource to the target terminal. This may be performed by RRC signaling (e.g., PC5-RRC signaling), MAC signaling (e.g., sidelink MAC CE), physical layer signaling (e.g., SCI), or the like. Also, the above-described methods for retransmitting the PSSCH through the reserved resource, releasing the reserved resource, and the like may be similarly applied to the configured grant PSSCH. For example, when Method 200 is applied, when the source terminal receives ACK as an HARQ-ACK feedback for the PSSCH from the target terminal or determines ACK, the source terminal may not perform retransmission of the PSSCH regardless of whether the retransmission of the PSSCH is instructed by the base station. In addition, the source terminal may release the reserved resource allocated for the retransmission of the PSSCH.

Whether or not to apply Method 200 or Method 210 may be configured by the base station to the source terminal through a signaling procedure or may be preconfigured to the source terminal. Meanwhile, in a terminal supporting both Method 200 and Method 210, Method 200 or Method 210 may be used selectively. In this case, which method to apply among Method 200 and Method 210 may be configured by the base station to the source terminal. The configuration may be a semi-static configuration by RRC signaling. Alternatively, if not preconfigured, the configuration may be a dynamic indication by physical layer signaling. For example, the base station may inform the source terminal whether to apply Method 200 or Method 210 while transmitting allocation information of the reserved resource. Such the information may be included in a DCI including the PSSCH resource allocation information, and may be transmitted through a PDCCH. Alternatively, such the information may be included in a DCI separate from the DCI including the PSSCH resource allocation information, and may be transmitted through a PDCCH similarly.

Mode 2 Resource Selection Method

The PSFCH resource for transmitting the HARQ-ACK for the PSSCH may be determined based on the position of the resource region in which the PSSCH and/or PSCCH (hereinafter referred to as PSSCH) is transmitted. For example, the PSFCH resource may be determined based on a time (e.g., slot(s) or symbol(s)) when the PSSCH is transmitted, a frequency region (e.g., subchannel(s)) in which the PSSCH is transmitted, a resource pool in which the PSCCH is transmitted, or the like. Here, the PSFCH resource may be used as a meaning including a part or all of a time-domain resource, a frequency-domain resource, and a code-domain resource. In this case, basically, a one-to-one correspondence relationship may be established between the PSSCH resource and the PSFCH resource. That is, once the PSSCH resource is determined, the PSFCH resource corresponding to the PSSCH resource may be uniquely determined.

However, in some cases, a plurality of PSSCH resources may correspond to one PSFCH resource. In this case, when a plurality of PSSCHs are transmitted to one terminal through the plurality of PSSCH resources, a plurality of HARQ-ACK information for the plurality of PSSCHs may be fed back through the corresponding one PSFCH resource by a method such as bundling, etc. Here, the plurality of PSSCHs may include different TB(s). On the other hand, when a plurality of PSSCHs are transmitted to a plurality of terminals through the plurality of PSSCH resources, the plurality of terminals may respectively transmit PSFCHs in response to reception of the PSSCHs through the corresponding one PSFCH resource. Therefore, a collision between the PSFCH transmissions may occur.

As a method for solving the above problem, one or a plurality of PSSCH resources corresponding to the same PSFCH resource may be regarded as one PSSCH resource group, and the sensing and resource selection for the second mode resource allocation may be performed by the terminal for each PSSCH resource group. That is, when at least one PSSCH resource constituting a certain PSSCH resource group is occupied or expected to be occupied by another terminal, the terminal may exclude all PSSCH resources of the PSSCH resource group from a set of resources available for transmission. Here, the 'PSSCH resource' is a term used for convenience of description, and may generally mean a unit of physical resource (e.g., time-frequency resource) for sensing and resource selection of the terminal. For example, one PSSCH resource may mean a resource region composed of one slot and one subchannel. A signal and/or channel other than the PSSCH and/or PSCCH may also be transmitted through the PSSCH resource.

Frequency regions of a plurality of PSSCH resources (e.g., a first resource and a second resource) within the same PSSCH resource group may be different from each other. For example, the first resource and the second resource may occupy different sets of subchannels. Also, time regions of the first resource and the second resource may be the same. For example, the first resource and the second resource may occupy the same set of slots.

The above method (i.e., sensing and resource selection on a PSSCH resource group basis) may be used only in some cases. For example, when the terminal (i.e., the source terminal) performing sensing and resource selection expects to receive HARQ-ACK from the target terminal(s), the above method may be used. In the opposite case, that is, when the source terminal does not expect to receive HARQ-ACK from the target terminal(s), a collision of PSFCHs due to the PSSCH transmission of the source terminal may not occur. Therefore, in the case, the source terminal may perform the sensing and resource selection procedure without application of the above method.

Meanwhile, one PSSCH resource may correspond to a plurality of PSFCH resources. This scheme may be used for sidelink transmission in an unlicensed band. That is, the target terminal receiving a PSSCH may transmit a PSFCH through one or more of a plurality of PSFCH resources corresponding to the PSSCH according to whether an LBT operation is successful or not and a time point of success of the LBT operation.

PSSCH Retransmission Resource Allocation

In case of the first mode resource allocation, the base station may allocate a PSSCH resource and configure (or indicate) allocation information for the PSSCH resource to the source terminal through a Uu interface. As described above, the PSSCH may be a PSSCH by a dynamic grant or a PSSCH by a configured grant, and the resource allocation information may be indicated through a DCI, configured through RRC signaling, or configured/indicated by a combination of a DCI and RRC signaling.

Hereinafter, a method for allocating a PSSCH retransmission resource will be described. The following exemplary embodiments will be described based on DCI signaling, but the content of the following exemplary embodiments may be easily applied to other various signaling schemes (e.g., sidelink RRC signaling, SCI signaling, etc.) described above.

The PSSCH retransmission scheme may be classified into an HARQ feedback based retransmission scheme and a blind retransmission scheme without HARQ feedback. In case of an initial transmission PSSCH scheduling, the base station may allocate an initial transmission resource to the source terminal through a DCI, and additionally allocate a retransmission (or repeated transmission) resource together with the initial transmission resource. In case of a retransmission PSSCH scheduling, the base station may allocate at least one retransmission resource to the source terminal through a DCI. Hereinafter, the number of retransmission resource(s) allocated in addition to one PSSCH resource scheduled by the DCI may be denoted as R.

The source terminal may perform blind retransmission (or repetitive transmission) of the PSSCH through the retransmission resource. Alternatively, the source terminal may perform HARQ feedback-based PSSCH retransmission through the retransmission resource. The source terminal may transmit a retransmission PSSCH to the target terminal through the retransmission resource, and may transmit resource allocation information therefor through a PSCCH (or a transmission resource of a 2-stage SCI). On the other hand, the base station may perform sidelink resource allocation in a state in which information such as sidelink traffic and channel state is not accurately identified, and in this case, a greater number of retransmission resources than necessary may be allocated to the source terminal. In this case, the source terminal may not transmit the retransmission PSSCH through some or all of the R retransmission resource(s). In addition, the source terminal may transmit the retransmission PSSCH based on an HARQ feedback from the target terminal through the retransmission resource(s). In this case, when receiving ACK as the HARQ response from the target terminal, the source terminal may not transmit the PSSCH in at least a part of the retransmission resource(s).

Figure 9:
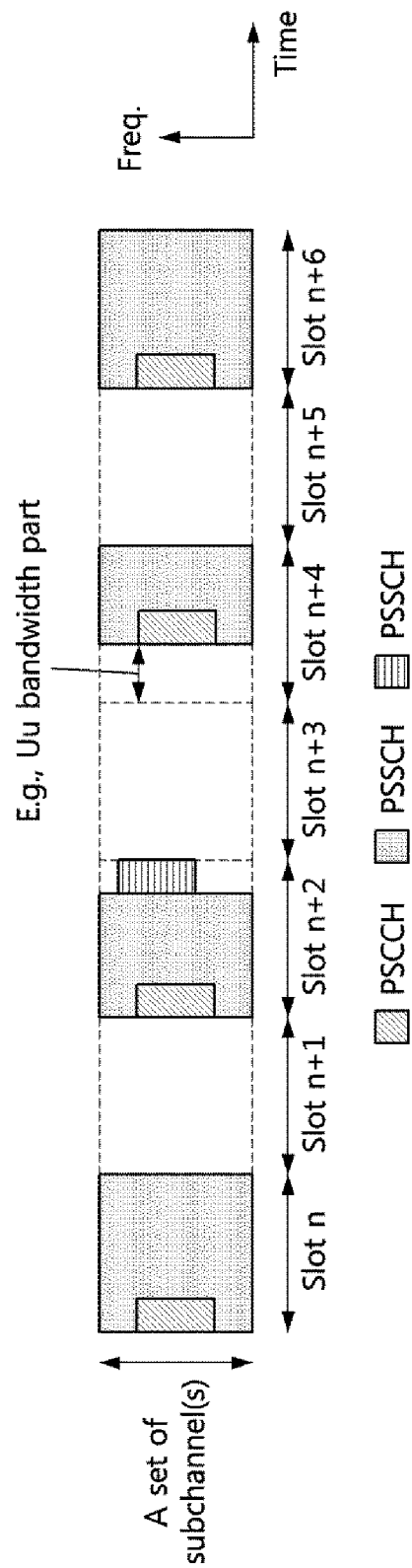
FIG. 9 is a conceptual diagram illustrating a first exemplary embodiment of PSSCH resource allocation.
Figure 10:
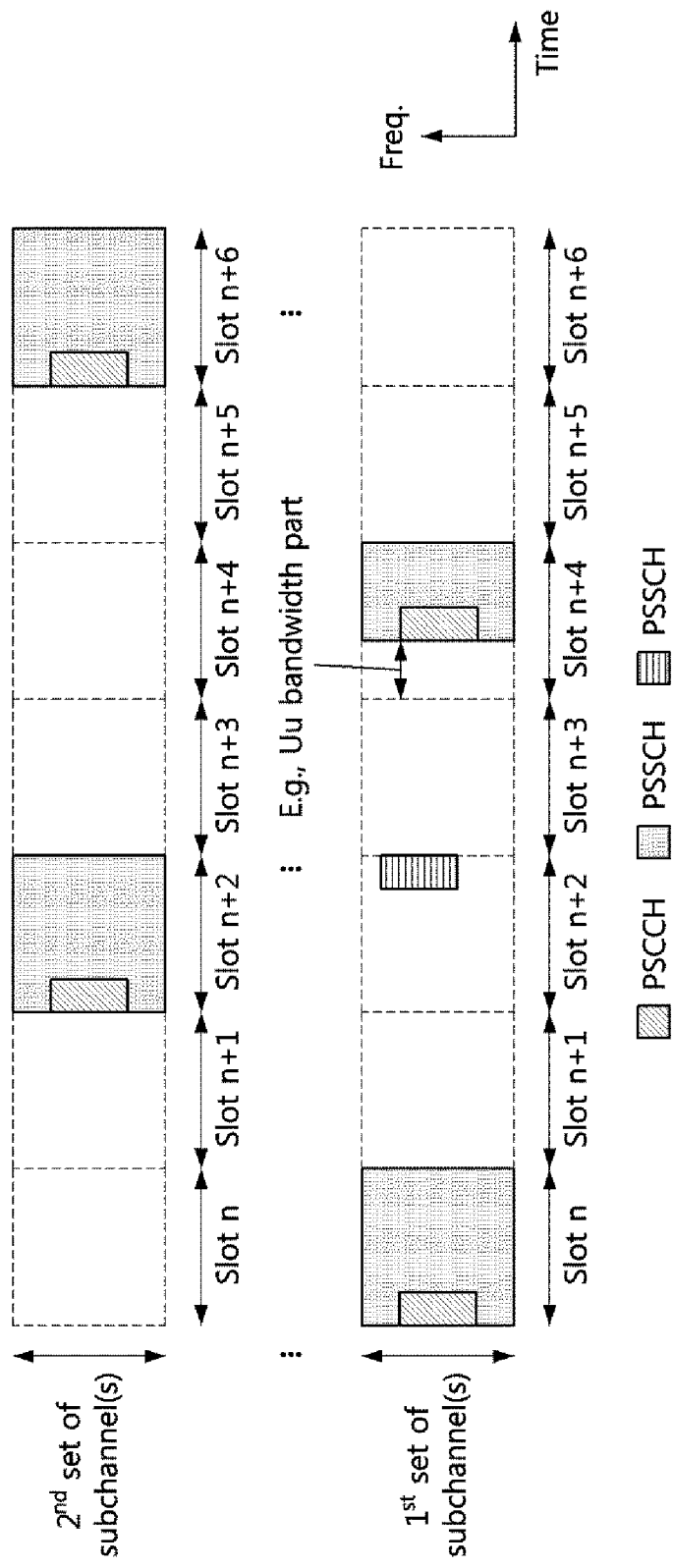
FIG. 10 is a conceptual diagram illustrating a second exemplary embodiment of PSSCH resource allocation.

FIG. 9 is a conceptual diagram illustrating a first exemplary embodiment of PSSCH resource allocation, and FIG. 10 is a conceptual diagram illustrating a second exemplary embodiment of PSSCH resource allocation.

Referring to FIGS. 9 and 10, the source terminal may transmit the PSSCH to the target terminal through a sidelink. PSSCHs may be transmitted for the same TB, and may be transmitted four times in total. The source terminal may transmit to the target terminal the PSCCH including the resource allocation information of the PSSCH together with each PSSCH. In some cases (e.g., in case of the sidelink configured grant PSSCH), the PSCCH transmission may be omitted. In addition, the PSCCH may be transmitted only for a part of the PSSCHs (e.g., the first PSSCH (initial transmission PSSCH)).

In case of the second mode resource allocation, the PSSCH resource may be determined by the source terminal. On the other hand, in case of the first mode resource allocation, the PSSCH resource may be determined by the base station, and allocation information of the determined PSSCH resource may be transmitted to the source terminal through a DCI. In FIGS. 9 and 10, the first PSSCH may be an initial transmission PSSCH or a retransmission PSSCH. As described above, the present exemplary embodiments may correspond to the case when R=3. Each PSSCH resource may be mapped to one slot. Further, according to the present exemplary embodiments, a distance between adjacent PSSCH resources may be constant, e.g., two slots. In this case, time domain resource allocation information of the PSSCH may include a slot to which the first PSSCH is allocated or its index (e.g., slot n) and a distance between PSSCH resources (e.g., 2 slots). When the time domain resource allocation information is information from the base station to the source terminal, the slot of the first PSSCH may be indicated or predefined as a relative distance (e.g., slot offset) from a time point of DCI transmission. When the time domain resource allocation information is information from the source terminal to the target terminal, the slot of the first PSSCH may be indicated or predefined as a relative distance (e.g., slot offset) from a time point of PSCCH or SCI transmission.

PSSCH resources allocated by the same DCI may have different durations. Referring to FIGS. 9 and 10, the first and fourth PSSCH resources may be mapped to the entire period of the slot. On the other hand, the third PSSCH resource may be mapped to symbol(s) belonging to the sidelink bandwidth part or the sidelink resource pool excluding symbol(s) belonging to the Uu bandwidth part in the slot (n+4). In addition, referring to FIG. 9, the second PSSCH resource may be mapped to symbol(s) excluding the symbol(s) to which the PSFCH resource is configured in the slot (n+2). Referring to FIG. 10, the PSFCH resource may be configured only in the first subchannel set in the slot (n+2). In this case, the second PSSCH resource may be mapped to the entire period of the slot (n+2) in the second subchannel set. In this case, the source terminal may transmit the PSFCH and the second PSSCH in the same symbol(s) in the slot (n+2).

Referring to FIG. 9, a plurality of PSSCH resources may be arranged in the same frequency region (e.g., the same subchannel set). That is, a common frequency domain resource allocation may be applied to a plurality of PSSCH resources. Referring to FIG. 10, frequency regions (e.g., subchannel sets) in which a plurality of PSSCH resources are arranged may be the same or different. For example, the first and third PSSCH resources may be arranged in the first subchannel set and the second and fourth PSSCH resources may be arranged in the second subchannel set. The first subchannel set and the second subchannel set may belong to the same sidelink resource pool. Alternatively, the first subchannel set and the second subchannel set may belong to different sidelink resource pools. In this case, when a frequency distance between a plurality of sidelink resource pools is long, a frequency diversity gain may be maximized. In this case, an HARQ-ACK for each PSSCH may be transmitted in one resource pool (e.g., a resource pool in which the first PSSCH (or the last PSSCH) is transmitted) or in a resource pool in which each PSSCH is transmitted. When HARQ-ACKs for a plurality of PSSCHs are transmitted through one PSFCH as bundled or multiplexed, these may be transmitted in one resource pool. The one resource pool may be configured or indicated from the source terminal to the target terminal. Alternatively, the one resource pool may be a resource pool in which the first PSSCH (or the last PSSCH) is transmitted. The resource allocation and scheduling information (e.g., SCI) of the PSSCH may include information regarding an index (or number) of the resource pool through which the PSSCH is transmitted.

Some PSSCH resource(s) may not be used for PSSCH transmission. For example, when a time period (e.g., slot) to which a PSSCH resource is allocated does not include sidelink resources (e.g., sidelink symbol, sidelink bandwidth part, sidelink resource pool), or includes sidelink resources smaller than a threshold (e.g., when the corresponding time period includes S1 or less sidelink symbol(s) or when the corresponding time period includes sidelink symbol(s) fewer by S2 or more symbols than the number of symbols configured by the base station), the PSSCH transmission may not be valid in the corresponding retransmission resource. The source terminal may drop the invalid retransmission resource and may not perform PSSCH transmission in the corresponding resource. Sidelink HARQ-ACK report information may not be defined for the invalid retransmission resource. Alternatively, the source terminal may not transmit sidelink HARQ-ACK report information corresponding to the invalid retransmission resource to the base station. Alternatively, the source terminal may transmit sidelink HARQ-ACK report information corresponding to the invalid retransmission resource even though the PSSCH transmission is omitted or dropped. In this case, the sidelink HARQ-ACK report information may be fixed to either ACK or NACK. In addition, when there is an invalid retransmission resource among the PSSCH retransmission resources allocated from the source terminal to the target terminal, the target terminal may also drop the invalid retransmission resource and not perform a PSSCH reception procedure in the corresponding resource. HARQ-ACK information may not be defined for the invalid retransmission resource. Alternatively, the target terminal may not transmit HARQ-ACK information corresponding to the invalid retransmission resource to the source terminal. Alternatively, the target terminal may transmit HARQ-ACK information corresponding to the invalid retransmission resource to the source terminal even though the PSSCH reception is omitted or dropped. In this case, the HARQ-ACK information may be fixed to either ACK or NACK.

In addition to the invalid PSSCH resource, the source terminal may not transmit the PSSCH through a part or all of the PSSCH retransmission resource(s) allocated from the base station. That is, the source terminal may release PSSCH resource(s) allocated from the base station. Information on the released PSSCH resource(s) may be signaled to the target terminal and the adjacent terminal (e.g., terminals performing a sensing and resource selection procedure for the second mode resource allocation).

In case of the terminal (e.g., source terminal) that simultaneously performs the first mode resource allocation and the second mode resource allocation, the terminal may include at least a part of resources (i.e., PSSCH resources or retransmission PSSCH resources) allocated by the base station in a set of resources available for the second mode resource allocation. For example, the terminal may omit a sensing procedure for PSSCH resource(s) released by the terminal itself among the PSSCH resource(s) allocated by the base station, and determine them as belonging to the set of resources available for transmission. A time (e.g., a specific slot) when the released PSSCH resource(s) is included in the set of resources available for transmission may be determined by a predetermined rule. For example, the released PSSCH resource(s) may be included in the set of resources available for transmission at the time (e.g., the corresponding slot) when the terminal releases the corresponding PSSCH resource(s). Alternatively, the terminal may include the corresponding PSSCH resource(s) in the set of resources available for transmission at a time when the PSSCH resource(s) are allocated from the base station (e.g., a time (e.g., a slot or a symbol) when a signal including resource allocation information of the PSSCH resource(s) is received). When the PSSCH resource(s) is configured by RRC signaling (e.g., in the case of the type 1 sidelink configured grant scheme), the terminal may include the corresponding PSSCH resource(s) in the set of resources available for transmission at a time when the terminal receives the corresponding RRC message (e.g., PDSCH including the RRC message).

The source terminal may use the retransmission PSSCH resource allocated from the base station for purposes other than retransmission. For example, the source terminal may transmit a sidelink signal other than a PSSCH and/or PSCCH through PSSCH resource(s) (i.e., R resource(s)) excluding the first PSSCH resource allocated through a DCI. Alternatively, the source terminal may transmit a PSSCH and/or a PSCCH corresponding thereto for a TB different from a TB scheduled through the DCI through the resource(s).

Meanwhile, the target terminal may assume a quasi-co-location (QCL) for reception of a PSSCH and/or PSCCH through the PSSCH resource. A receiving node may assume that QCL is established between certain signal(s) and channel(s), and types of the QCL may include a delay spread, a Doppler spread, a Doppler shift, an average gain, an average delay, a spatial Rx parameter, etc. In terms of spatial reception parameters, the QCL may mean that reception beams (e.g., analog reception beams), reception channel spatial correlation, transmission beams, and transmission/reception beam pairs are identical between the objects. In the case of NR, the receiving node may assume or be configured with QCL types A, B, C, and/or D. QCL information may be included in transmission configuration information (TCI) state, and configured to the receiving node. The TCI state may include one or a plurality of signals (e.g., reference signals, synchronization signals, etc.) as a reference(s) for the QCL type and the QCL assumption.

The source terminal may configure (or indicate) QCL information for reception of a PSSCH and/or PSCCH to the target terminal. When a plurality of PSSCH resources are configured by one signaling, the QCL information may be configured for each PSSCH resource. Alternatively, the QCL information may be configured for PSSCH resource(s) excluding the first PSSCH resource (in the time domain). The same QCL information may be commonly applied to a plurality of PSSCH resources. Meanwhile, the PSSCH resource allocation information transmitted by the base station to the source terminal may not include QCL information for reception of the target terminal. That is, the entity that configures the QCL of the terminal receiving the sidelink signal may be the source terminal Sidelink Resource Reservation Method As described above, sidelink resources may be reserved in consideration of a possibility of future sidelink transmission. For example, sidelink resources may be reserved for future PSSCH and/or PSCCH transmission. The terminal (e.g., source terminal) may determine a specific resource as a reserved resource, and transmit information on the reserved resource to other terminals (e.g., target terminal) through signaling. This may correspond to the first mode resource allocation and the second mode resource allocation. In addition, the base station may determine a specific resource as a reserved resource, and transmit information on the reserved resource to the terminal (e.g., source terminal) through signaling. This may correspond to the first mode resource allocation. In addition, the allocation information of the reserved resource may be received by adjacent terminals (e.g., terminal performing at least the second mode resource allocation) through a sensing procedure.

The above-described PSSCH retransmission resource may be regarded as a reserved resource. Particularly, when a method in which the source terminal uses a retransmission PSSCH resource allocated by the base station for a purpose other than retransmission is applied, the PSSCH resource configured by the base station to the source terminal may not be distinguished from the reserved resource configured by the base station to the source terminal at least in terms of terminal operation. At least in case of the first mode resource allocation, the PSSCH resource configured by the base station to the source terminal may not be distinguished from the reserved resource configured by the base station to the source terminal, at least in terms of terminal operation.

A separate resource other than the PSSCH resource may be allocated as a reserved resource. The reserved resource may be configured as a combination of a specific time resource and frequency resource. Since the reserved resource may be basically allocated for PSSCH transmission, a time and frequency resource allocation unit (or granularity) of the reserved resource may be equal to or larger than a unit of the PSSCH. For example, the time resource allocation unit of the reserved resource may be a slot, and the frequency resource allocation unit thereof may be a subchannel. Alternatively, the time resource allocation unit of the reserved resource may be a plurality of slots, and the frequency resource allocation unit may be a plurality of subchannels. One reserved resource may belong to one sidelink resource pool. Even when the reserved resource is allocated in units of slot(s) in the time domain, some symbol(s) of the slot, i.e., symbol(s) (e.g., symbols not included in the sidelink resource pool, Uu downlink symbols, Uu flexible symbols, symbols in which a PSFCH resource is configured, symbols for automatic gain control (AGC), symbols for transmission direction switching, symbols for bandwidth part switching, etc.) defined or configured for purposes other than PSSCH and/or PSCCH transmission may be excluded from the reserved resource. Alternatively, a method in which the reserved resource itself is configured to include the above-described symbol(s) and the symbol(s) are excluded in a step of transmitting a PSSCH and/or PSCCH through the reserved resource may be considered. The resource allocation unit of the reserved resource may follow a predefined value or may be configured to the terminal. When the resource allocation unit of the reserved resource is the same as the PSSCH resource allocation unit, the resource allocation unit of the reserved resource may not be configured separately to the terminal.

Other information besides time and frequency resource information may be included in the allocation information of the reserved resource. For example, spatial resource information (e.g., antenna port number(s) of a signal or channel to be allocated to the reserved resource), scheduling information (e.g., HARQ process number, modulation and coding scheme (MCS), redundancy version (RV), new data indicator (NDI), whether or not the same TB is applied, number of transmission layers, number of TB(s), precoding information, etc. of a PSSCH) of a channel to be allocated to the reserved resource may be included in the allocation information of the reserved resource. In case that the information is configured when the reserved resource is allocated, the transmission through the reserved resource may be performed based on the information. Alternatively, new or updated information may be configured after the reserved resource is configured, and the transmission through the reserved resource may be performed based on the new information.

A plurality of reserved resources may be configured (or indicated). For example, a plurality of reserved resources may be configured to the terminal for a plurality of retransmissions for the same TB. For another example, a plurality of reserved resources may be configured to the terminal for transmission of a plurality of different TBs. For another example, a plurality of reserved resources may be configured to the terminal for retransmission of the same TB and transmission of another TB. The plurality of reserved resources may be configured simultaneously through one (or one time) signaling (e.g., SCI format, DCI format, RRC parameter, etc.), or may be configured through signaling at one time. Alternatively, a plurality of reserved resources may be configured through a plurality of signaling. The maximum number of reserved resources that can be configured through one signaling may be predefined.

The allocation information of the reserved resource may be included in a SCI and may be transmitted from the source terminal to the target terminal through a sidelink (e.g., PSCCH, two-stage SCI transmission resource). In addition, in case of the first mode, the allocation information of the reserved resource may be included in a DCI (e.g., group common DCI) and transmitted from the base station to the terminal (e.g., source terminal) through a Uu downlink (e.g., PDCCH). The SCI and DCI may be a SCI and a DCI including scheduling information of a PSSCH (hereinafter, a first PSSCH), respectively. In this case, the first PSSCH may be a PSSCH by a dynamic grant, and the DCI may correspond to a dynamic grant. Alternatively, the first PSSCH may be a PSSCH by a sidelink configured grant (e.g., type 2 sidelink configured grant), and the DCI may be a DCI indicating activation, initialization, etc. of the configured grant PSSCH resource configuration.

Meanwhile, when the reserved resource is allocated for the configured grant PSSCH, the allocation information of the reserved resource may be transmitted from the source terminal to the target terminal through RRC signaling and/or a SCI. Also, in case of the first mode, the allocation information of the reserved resource may be transmitted from the base station to the terminal (e.g., source terminal) through RRC signaling and/or a DCI. The RRC signaling, SCI, and DCI may each include at least a part of scheduling information of the PSSCH. For convenience, the PSSCH may be also referred to as the first PSSCH. When the first PSSCH is a PSSCH based on the type 1 configured grant, the reserved resource may be configured only by RRC signaling.

In this case, the reserved resource may be allocated for the purpose of retransmission of the first PSSCH. A resource region of the reserved resource may be configured based on a resource region of the first PSSCH. This may be referred to as 'Method 300'. According to Method 300, a frequency region of the reserved resource may be derived based on a frequency region of the first PSSCH. Also, a duration of the reserved resource may be derived based on a duration of the first PSSCH.

Figure 11:
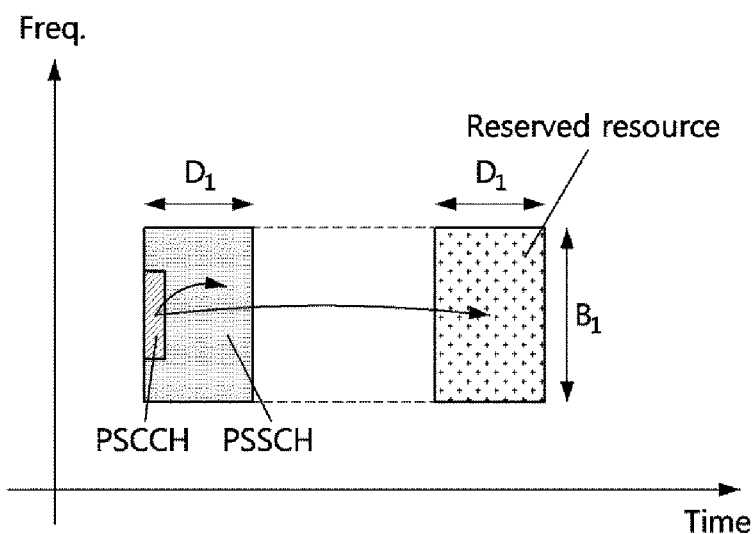
FIG. 11 is a conceptual diagram illustrating a first exemplary embodiment of sidelink reserved resource allocation.

FIG. 11 is a conceptual diagram illustrating a first exemplary embodiment of sidelink reserved resource allocation.

Referring to FIG. 11, a PSSCH may be transmitted through a sidelink resource, and the PSSCH may be scheduled by a PSCCH. That is, scheduling information of the PSSCH may be transmitted through the PSCCH. In addition, allocation information for a sidelink reserved resource may be included in the PSCCH. The reserved resource may be for retransmission of the PSSCH or for transmission of a PSSCH for another TB other than the TB of the PSSCH. In this case, according to Method 300, a frequency region (i.e., $B_1$) of the reserved resource may be the same as a frequency region of the PSSCH. In addition, the duration (i.e., $D_1$) of the reserved resource may be the same as the duration of the PSSCH.

In addition, in this case, a time domain location (e.g., slot(s) or symbol(s)) of the reserved resource may be derived with reference to a time domain location (e.g., slot(s) or symbol(s)) of the first PSSCH. For example, the time domain location of the reserved resource may be determined by a time offset between the reserved resource and the first PSSCH. When a plurality of reserved resources are configured, a plurality of time offsets may be used to arrange the reserved resources. The plurality of time offsets may have the same or different values. The time offset(s) may be predefined in the technical specification or configured to the terminal. When the first PSSCH is scheduled to be repeatedly transmitted through a plurality of resources, one reserved resource may be configured to include a plurality of resources. Alternatively, regardless of whether or not the first PSSCH is repeatedly transmitted, one reserved resource may be configured as one resource.

Meanwhile, the allocation information of the reserved resource may be included in a separate SCI instead of the SCI for PSSCH scheduling, and may be transmitted from the source terminal to the target terminal through the sidelink (e.g., PSCCH, two-stage SCI). In addition, in case of the first mode, the allocation information of the reserved resource may be included in a separate DCI (e.g., group common DCI) instead of the DCI for PSSCH scheduling, and may be transmitted from the base station to the terminal (e.g., source terminal) through a Uu downlink (e.g., PDCCH). For example, the separate SCI (or DCI) may have a SCI format (or DCI format) different from that of the SCI (or DCI) format for the PSSCH scheduling, or a payload size different from that of the SCI (or DCI) for the PSSCH scheduling. Alternatively, a CRC of the separate SCI (or DCI) may be scrambled with an RNTI different from an RNTI of the SCI (or DCI) for the PSSCH scheduling. In this case, the reserved resource may not be associated with a specific PSSCH or a specific TB. For example, the reserved resource may be used for PSSCH transmission for an initial transmission or retransmission of an arbitrary TB.

In this case, the resource region of the reserved resource may be configured by a resource allocation procedure independent of PSSCH resource allocation. This may be referred to as 'Method 310'.

Figure 12:
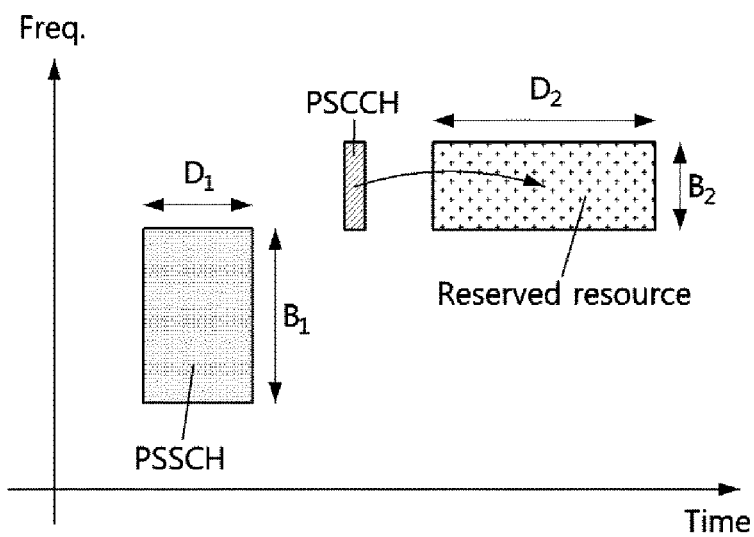
FIG. 12 is a conceptual diagram illustrating a second exemplary embodiment for sidelink reserved resource allocation.

FIG. 12 is a conceptual diagram illustrating a second exemplary embodiment for sidelink reserved resource allocation.

Referring to FIG. 12, a PSSCH may be transmitted through a sidelink resource. In addition, a sidelink reserved resource may be allocated, and allocation information of the sidelink reserved resource may be transmitted to the terminal through a PSCCH. The reserved resource may be for retransmission of the PSSCH or for transmission of a PSSCH for a TB different from the TB of the PSSCH. In this case, according to Method 310, time and frequency resource regions of the reserved resource may be configured independently of time and frequency resource regions of the PSSCH (e.g., the above PSSCH). That is, in FIG. 12, $D_1$ and $D_2$ may be the same or different, and $B_1$ and $B_2$ may be the same or different.

In Method 310, a resource allocation unit of the reserved resource may be the same or similar to that of the PSSCH.

In addition, configuration of the resource allocation information of the reserved resource, parameters thereof, a signaling method thereof, etc., may be the same as or similar to those of the PSSCH resource allocation. For example, when the reserved resource is allocated by a SCI and/or DCI, time and frequency domain resource assignment fields of the reserved resource may be the same as or similar to time and frequency domain resource assignment fields of the PSSCH, and an interval of the reserved resource may be configured in form of a time offset (e.g., slot offset) from the time (e.g., slot) when the SCI and/or DCI is transmitted. In addition, the resource allocation of the PSSCH and the resource allocation of the reserved resource may be configured only by RRC signaling or by a combination of RRC signaling and SCI (or DCI).

Method 300 and Method 310 may be used selectively or adaptively. As described above, when the reserved resource is allocated through signaling for scheduling the PSSCH or for retransmission of the same TB, Method 300 may be used, and otherwise, Method 310 may be used. Alternatively, the sidelink terminal may be configured by the base station which method among Method 300 and Method 310 to apply.

Method 300 may not be limited to a specific case, and may be generally used. For example, Method 300 may be used even when the reserved resource is allocated through signaling other than the signaling for scheduling the PSSCH. In this case, the signaling may include information on a resource region (e.g., a resource region of a specific PSSCH) that is a reference for deriving a resource region of the reserved resource. Likewise, Method 310 also may not be limited to a specific case, and may be generally used. For example, even when the reserved resource is allocated through signaling for scheduling the PSSCH, Method 310 may be used. In this case, the signaling may include a plurality of resource allocation information (e.g., a plurality of time domain resource assignment fields/parameters, a plurality of frequency domain resource assignment fields/parameters) for a plurality of resources. According to the above-described method, the same configuration method may be used for a case when the reserved resources are for the same TB and a case when the reserved resources are not for the same TB. In this case, according to an exemplary embodiment, a plurality of reserved resources may be configured through one signaling, and a retransmission PSSCH for the same TB may be transmitted in some reserved resources among the plurality of reserved resources, and a PSCCH for another TB may be transmitted in some other reserved resources among the plurality of reserved resources.

A reserved resource ID may be used for configuration of a reserved resource. When configuring a plurality of reserved resources, an ID may be assigned to each reserved resource. Alternatively, the same ID may be assigned to a plurality of reserved resources (e.g., a reserved resource group). The ID of the reserved resource or the reserved resource group (hereinafter referred collectively to as the 'reserved resource') may be included in reserved resource configuration information. In this case, for each reserved resource, an ID or information on the ID may be transmitted (together with allocation information of the reserved resource). For example, the target terminal may be allocated two reserved resources through RRC signaling or an SCI from the source terminal, an ID of the first reserved resource may be set to 0, and an ID of the second reserved resource may be set to 3. This method has a disadvantage in that signaling overhead is large because information on the ID should be transmitted for each reserved resource.

Alternatively, an ID or information on the ID of one reserved resource may be transmitted (together with allocating information of the reserved resource), and an ID of another reserved resource may be derived from the ID or the information on the ID. For example, the source terminal may be allocated two reserved resources through RRC signaling or a DCI from the base station, and an ID of the first reserved resource may be set to 0. The source terminal may determine an ID of the second reserved resource based on the ID of the first reserved resource. For example, a rule in which IDs are mapped in ascending order may be applied to a plurality of reserved resources configured at the same time, and in this case, the source terminal may determine the ID of the second reserved resource to be 1.

As another method, the ID of the reserved resource may be sequentially assigned in a predetermined order. For example, a circular counter from 0 to C may be used, and IDs of reserved resources may be assigned in order of 0, 1, . . . , C, 0, 1, . . . , C, and the like. The assignment of the reserved resource ID may be determined based on the order in which the corresponding reserved resource is allocated to the terminal. Information on the counter (e.g., the latest counter value) may be transmitted to the terminal to which the reserved resource is configured (together with allocation information of the reserved resource). As yet another method, information on the ID of the reserved resource may not be explicitly configured and may be determined by an implicit method. For example, the ID of the reserved resource may be determined from a location of a time domain resource and/or frequency domain resource to which the reserved resource is allocated. Alternatively, the ID of the reserved resource may be configured by a combination of an explicit method and an implicit method.

The IDs of the reserved resources may be duplicately configured. That is, the terminal (e.g., target terminal and source terminal) may receive a reserved resource having the same ID as an ID of a previously reserved resource. In this case, validity of the reserved resource ID previously assigned may be considered as a condition for determining whether the corresponding ID is duplicated or not. For a reserved resource, an ID of the reserved resource may be considered valid at a time when signal transmission is valid in the corresponding reserved resource. For example, an ID of a reserved resource may be considered valid at a time point earlier than a period in which the reserved resource is allocated (e.g., until a time point earlier by L slots (or symbols) than a first slot (or symbol) constituting the reserved resource). Here, L may be an integer equal to or greater than 0. Although the same ID as the ID of the reserved source whose period has already ended is assigned, the terminal may not consider the ID as a duplicate ID. When the ID of the reserved resource is determined as duplicated, the terminal may consider that the reserved resource configured later for the corresponding ID is valid. The terminal may consider that the reserved resource previously configured for the corresponding ID is no longer valid. On the other hand, as another method, when IDs of reserved resources are duplicated, the terminal may consider this as an error, and regard all the reserved resources having the same ID as invalid. Alternatively, the terminal may not expect that the ID of the reserved resource is configured duplicately.

When a PSSCH is transmitted through a reserved resource to the target terminal, the source terminal may inform scheduling information of the PSSCH together. In this case, the source terminal may inform the target terminal of the ID of the reserved resource instead of resource allocation information of the PSSCH (e.g., time domain and frequency domain resource assignment information). When the target terminal has been previously allocated the reserved resource and its ID, the scheduled PSSCH may be considered to be allocated to the entire region of the reserved resource.

As described above, the reserved resource may be released. When it is determined that the reserved resource is unnecessary, a node (e.g., base station or source terminal) that has configured the reserved resource or a node (e.g. source terminal) that has been configured with the reserved resource may release the corresponding reserved resource. Information on the release of the reserved resource may be signaled to the node (e.g., target terminal, source terminal, adjacent terminal performing a sensing procedure, etc.) configured with the reserved resource. For example, the information on the release of the reserved resource may be indicated from the base station to the source terminal through Uu downlink (e.g., PDCCH). The information on the release of the reserved resource may include an ID of the reserved resource to be released.

Composition of Communication Node

Figure 13:
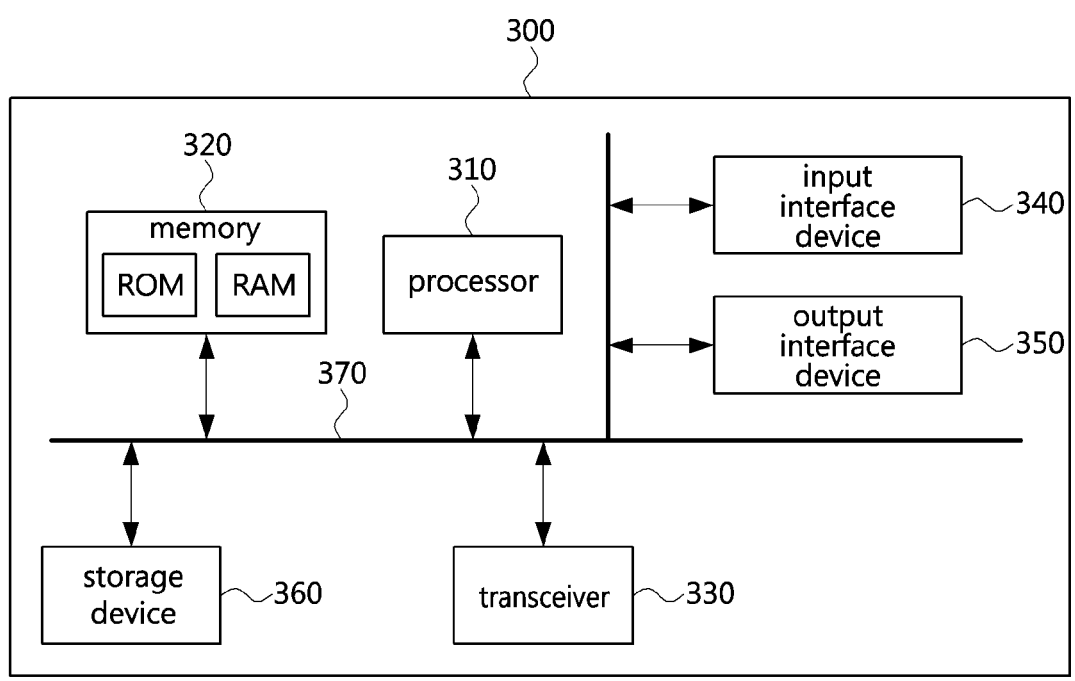
FIG. 13 is a block diagram illustrating a communication node according to exemplary embodiments of the present disclosure.

FIG. 13 is a block diagram illustrating a communication node according to exemplary embodiments of the present disclosure.

The communication node illustrated in FIG. 13 may be the terminal or the base station that is an apparatus performing the methods according to the exemplary embodiments of the present disclosure.

Referring to FIG. 13, a communication node 300 may include at least one processor 310, a memory 320, and a transceiver 330 connected to a network to perform communication. In addition, the communication node 300 may further include an input interface device 340, an output interface device 350, a storage device 360, and the like. The components included in the communication node 300 may be connected by a bus 370 to communicate with each other.

However, each component included in the communication node 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present invention are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method for reporting sidelink hybrid automatic repeat request (HARQ) response information, performed by a first terminal, the method comprising:
receiving allocation information of a physical sidelink shared channel (PSSCH) resource for transmission of a PSSCH from a base station;
transmitting the PSSCH to a second terminal using the PSSCH resource;
identifying a physical sidelink feedback channel (PSFCH) resource for reception of a PSFCH corresponding to the transmission of the PSSCH, and attempting to receive the PSFCH from the second terminal using the PSFCH resource;
determining a time of transmitting HARQ response information corresponding to the transmission of the PSSCH; and
transmitting the HARQ response information corresponding to the transmission of the PSSCH to the base station at the determined time,
wherein the time of transmitting the HARQ response information is represented by a time offset L from a slot to which the PSFCH resource belongs, and information on the time of transmitting the HARQ response information is transmitted from the base station to the first terminal.

2. The method according to claim 1, wherein the time offset L (L is an integer equal to or greater than 0) means a number of slot(s), and when the PSFCH resource belongs to a slot n, the time of transmitting the HARQ response information is determined as a slot (n+L).

3. The method according to claim 2, wherein each of the slot n and the slot (n+L) is one of slots in an uplink carrier or an uplink bandwidth part through which the HARQ response information is transmitted, the number of slot(s) indicated by the time offset L is a number of slot(s) of the uplink carrier or uplink bandwidth part, and the slot n is one of slot(s) of the uplink carrier or uplink bandwidth part, which overlap with the PSFCH resource.

4. The method according to claim 1, wherein the HARQ response information is transmitted to the base station through a physical uplink control channel (PUCCH) or a physical uplink shared channel (PUSCH).

5. The method according to claim 1, wherein the HARQ response information includes acknowledgment (ACK), includes negative ACK (NACK), or includes either ACK or NACK.

6. The method according to claim 1, wherein the PSSCH resource is a PSSCH resource scheduled by a dynamic grant or a PSSCH resource scheduled by a configured grant.

7. The method according to claim 1, wherein the PSFCH resource is an earliest PSFCH resource among PSFCH resources appearing from a slot after K (K is an integer equal to or greater than 0) slot(s) from a slot to which the PSSCH resource belongs, and K is a predefined value, a value configured by the base station to the terminal, or a value preconfigured to the first terminal.

8. The method according to claim 7, wherein the K slot(s) are slot(s) belonging to a sidelink resource pool for the transmission of the PSSCH.

9. The method according to claim 1, wherein the PSFCH includes reception response information for the PSSCH, and the HARQ response information is generated based on the reception response information for the PSSCH received through the PSFCH.

10. A method for receiving sidelink hybrid automatic repeat request (HARQ) response information reported by a terminal, performed by a base station, the method comprising:
   transmitting allocation information of a physical sidelink shared channel (PSSCH) resource for transmission of a PSSCH to the terminal;
   identifying a physical sidelink feedback channel (PSFCH) resource for the terminal to receive a PSFCH corresponding to the transmission of the PSSCH;
   determining a time of receiving HARQ response information corresponding to the transmission of the PSSCH; and
   receiving the HARQ response information corresponding to the transmission of the PSSCH from the terminal at the determined time,
   wherein the time of receiving the HARQ response information is represented by a time offset L from a slot to which the PSFCH resource for the terminal to receive the PSFCH corresponding to the transmission of the PSSCH belongs, and information on the time of receiving the HARQ response information is transmitted from the base station to the terminal.

11. The method according to claim 10, wherein the time offset L (L is an integer equal to or greater than 0) means a number of slot(s), and when the PSFCH resource belongs to a slot n, the time of receiving the HARQ response information is determined as a slot (n+L).

12. The method according to claim 11, wherein each of the slot n and the slot (n+L) is one of slots in an uplink carrier or an uplink bandwidth part through which the HARQ response information is received, the number of slot(s) indicated by the time offset L is a number of slot(s) of the uplink carrier or uplink bandwidth part, and the slot n is one of slot(s) of the uplink carrier or uplink bandwidth part, which overlap with the PSFCH resource.

13. The method according to claim 10, wherein the HARQ response information is received from the terminal through a physical uplink control channel (PUCCH) or a physical uplink shared channel (PUSCH).

14. The method according to claim 10, wherein the HARQ response information includes acknowledgment (ACK), includes negative ACK (NACK), or includes either ACK or NACK.

15. The method according to claim 10, wherein the PSSCH resource is a PSSCH resource scheduled by a dynamic grant or a PSSCH resource scheduled by a configured grant.

16. The method according to claim 10, wherein the PSFCH resource is an earliest PSFCH resource among PSFCH resources appearing from a slot after K (K is an integer equal to or greater than 0) slot(s) from a slot to which the PSSCH resource belongs, and K is a predefined value, a value configured by the base station to the terminal, or a value preconfigured to the first terminal.

17. The method according to claim 16, wherein the K slot(s) are slot(s) belonging to a sidelink resource pool for the transmission of the PSSCH.

* * * * *